United States Patent [19]
Gehring

[11] Patent Number: 5,087,084
[45] Date of Patent: Feb. 11, 1992

[54] FITTING FOR EXTERNALLY GROOVED END PORTIONS OF TUBULAR BODIES

[75] Inventor: Peter Gehring, Simonswald-Griesbach, Fed. Rep. of Germany

[73] Assignee: Anton Hummel GmbH Metallwarenfabrik, Waldkirch, Fed. Rep. of Germany

[21] Appl. No.: 474,277

[22] Filed: Feb. 2, 1990

[30] Foreign Application Priority Data

Feb. 4, 1989 [DE] Fed. Rep. of Germany ....... 3903355

[51] Int. Cl.⁵ .............................................. F16L 39/02
[52] U.S. Cl. ................................... 285/319; 285/321; 285/423; 285/903; 285/906; 285/921
[58] Field of Search ............... 285/319, 320, 321, 921, 285/903, 332.4, 906, 38, 423; 403/329, 330

[56] References Cited

U.S. PATENT DOCUMENTS

| 4,368,904 | 1/1983 | Lanz | 285/175 |
| 4,441,745 | 4/1984 | Nicholas | 285/417 |
| 4,542,922 | 9/1985 | Grossauer | 285/903 X |
| 4,575,133 | 3/1986 | Nattel | 285/319 |

FOREIGN PATENT DOCUMENTS

| 0046616 | 6/1984 | European Pat. Off. . |
| 2906317 | 8/1979 | Fed. Rep. of Germany . |
| 3626403 | 2/1988 | Fed. Rep. of Germany . |
| 3721354 | 1/1989 | Fed. Rep. of Germany . |
| 1600912 | 4/1978 | United Kingdom . |

Primary Examiner—Randolph A. Reese
Assistant Examiner—Heather Chun
Attorney, Agent, or Firm—Peter K. Kontler

[57] ABSTRACT

A fitting for externally grooved and ribbed end portions of pipes, tubes, hoses and like tubular bodies has a tubular section and one or more circumferentially extending prongs each having one end integral with but pivotable relative to the section and a free second end. The inner side of each prong has one or more one-piece or composite circumferentially extending protuberances. In order to couple the fitting to the end portion of a tubular body, the free end of each prong is pulled radially outwardly to extract the protuberance or protuberances from the interior of the tubular section. The end portion of a tubular body is thereupon inserted into the section, and the prong or prongs are released to introduce their protuberances into the adjacent external groove or grooves of the inserted end portion. Each prong is surrounded by a substantially U-shaped slot of the tubular section to permit slight axial movements of the free end portion of the respective prong.

39 Claims, 13 Drawing Sheets

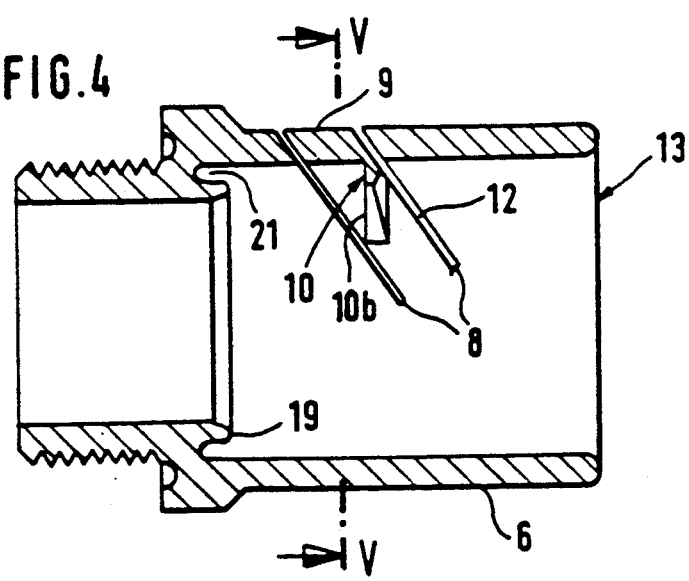
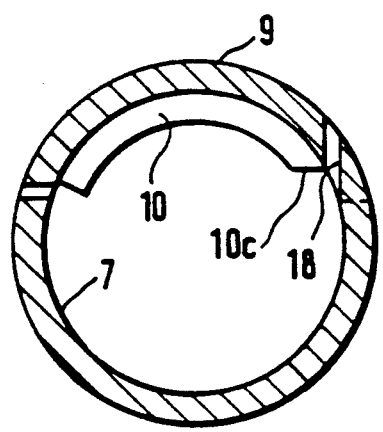
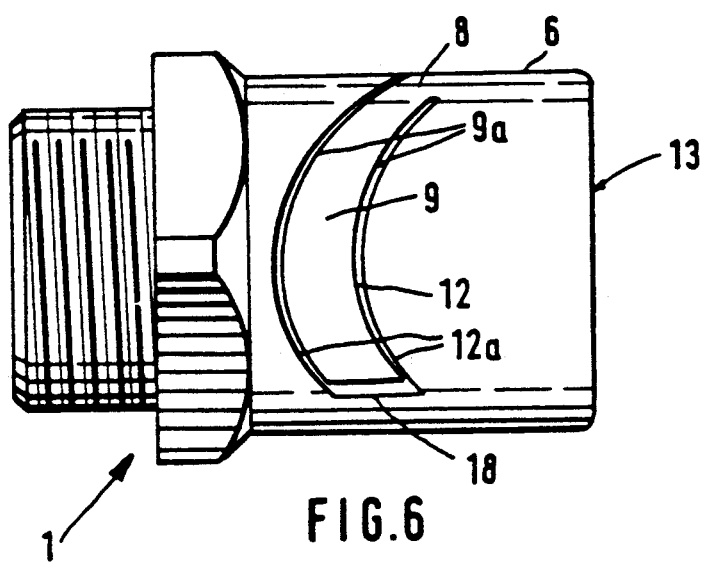
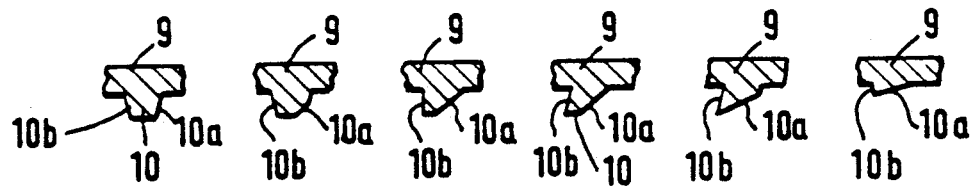

FITTING FOR EXTERNALLY GROOVED END PORTIONS OF TUBULAR BODIES

BACKGROUND OF THE INVENTION

The invention relates to devices for attaching hoses, pipes or other tubular bodies to other tubular bodies or to housings, casings or like parts. More particularly, the invention relates to improvements in fittings which can be used to engage the internally and/or externally ribbed and/or grooved end portions of tubular bodies. Still more particularly, the invention relates to improvements in fittings of the type wherein a tubular section of a sleeve serves to surround the end portion of an externally grooved hose, pipe or other tubular body and the sleeve has at least one protuberance which is receivable in an external groove to thus oppose undesirable extraction of the end portion of the tubular body from, or any other axial shifting of the end portion relative to, the tubular section.

Published German patent application No. 36 26 403 of Lanz discloses a fitting wherein the tube-receiving end of a sleeve is provided with four axially extending prongs having radially inwardly extending free end portions which can snap into the external groove of the end portion of a tubular body to hold the end portion in the interior of the sleeve. A drawback of the fitting of Lanz is that proper retention of the end portion of an externally grooved tubular body is possible only if the sleeve is provided with a substantial number of prongs. Furthermore, it is rather difficult and time-consuming to disengage the numerous prongs from the inserted end portion of a tubular body. Still further, adequate elasticity of the prongs is ensured only by employing relatively long prongs which can be achieved only by increasing the axial length of the sleeve. This, in turn, reduces the versatility of the fitting.

European Pat. No. 0 046 616 to Nicholas discloses a fitting which serves to simultaneously receive the end portions of two externally grooved and ribbed tubular bodies. The sleeve of the fitting has two pairs of axially extending prongs with radially inwardly extending ribs. The ribs of one pair of prongs are receivable in an external groove of the end portion of a first tubular body which has been introduced by way of one axial end of the sleeve, and the ribs of the other pair of prongs are receivable in an external groove of the end portion of a second tubular body which is to be introduced through the other end of the sleeve. Circumferentially spaced apart internal stops are provided in the sleeve to limit the extent of penetration of the tubular bodies. The sleeve is relatively long and the extraction of ribs from the external grooves of the respective tubular bodies necessitates the utilization of tools. Extraction of the tubular bodies is difficult on the additional ground that the relatively short axially extending prongs offer a pronounced resistance to outward flexing if they are to reliably hold the inserted end portions of tubular bodies. The versatility of the patented fitting is unsatisfactory because it can be used only as a means for coupling two externally corrugated hoses or analogous tubular bodies end-to-end.

Other conventional fittings are disclosed in published German patent application No. 29 06 317 of Offringa, in British Pat No. 1,600,912 to Wavin B. V. and in published German patent application No. 37 21 354 of Lanz. Reference may also be had to U.S. Pat. No. 4,368,904 to Lanz which discloses a composite multiple-component connection fitting for reception and retention of the end portions of flexible corrugated tubing.

OBJECTS OF THE INVENTION

An object of the invention is to provide a relatively short, compact and inexpensive fitting which can properly retain the end portion of an externally grooved tubular body even if only a short part of the tubular body extends into the fitting.

Another object of the invention is to provide a fitting which need not rely on axially extending prongs for reliable retention of the end portion of an externally grooved tubular body in its interior.

A further object of the invention is to provide a fitting which can retain the end portion of a tubular body with the same force as, or even with a greater force than, a conventional fitting.

An additional object of the invention is to provide a fitting which can be used for reception and retention of the end portions of flexible hoses, flexible metallic or plastic tubes, or rigid metallic or plastic pipes as long as the end portions have one or more circumferentially extending external grooves.

Still another object of the invention is to provide a fitting which is simpler and less expensive but more versatile than heretofore known fittings for the externally grooved end portions of tubular bodies.

A further object of the invention is to provide the fitting with novel and improved retaining means for the end portions of tubular bodies and with novel and improved means for limiting the extent of penetration of the end portions of tubular bodies into the fitting.

Another object of the invention is to provide novel and improved carrier or support means for two or more fittings of the above outlined character.

An additional object of the invention is to provide a fitting which is constructed and designed in such a way that it can sealingly engage the inserted end portion of a tubular body without the need for discrete sealing elements.

Another object of the invention is to provide a fitting which can be used to connect the inserted end portion of a tubular body with the end portion of another tubular body or with a housing, a casing or a like part.

An additional object of the invention is to provide a fitting which can receive and retain the end portions of rigid or flexible tubular bodies with the same degree of reliability.

A further object of the invention is to provide a fitting which exhibits all of the above outlined advantages as well as the additional advantage that it can be rapidly attached to as well as rapidly detached from the end portion of a tubular body, either by hand or by resorting to rudimentary tools.

Another object of the invention is to provide a fitting the retaining action of which can be selected practically at will and which is or can be constructed in such a way that the retaining action increases proportionally with the application of forces which tend to change the axial position of the inserted end portion of a tubular body relative to the fitting.

An additional object of the invention is to provide a novel and improved method of making the above outlined fitting.

A further object of the invention is to provide a fitting wherein the prong or prongs can exhibit pronounced flexibility even though their length in the axial direction of the fitting is or can be a minute fraction of the axial length of prongs in conventional fittings.

Another object of the invention is to provide a fitting wherein the axial length of the tubular section need not exceed, or need not appreciably exceed, the maximum outer diameter of such tubular section.

SUMMARY OF THE INVENTION

The invention is embodied in a fitting which can be attached to an end portion of a pipe or hose (hereinafter called tube) having one or more circumferentially extending external ribs alternating with circumferentially extending external grooves. The improved fitting includes a sleeve comprising a tubular main section serving to receive the end portion of a tube, and a substantially circumferentially extending elastic prong or tongue having a first end integral with the tubular section and a free second end. The tubular section has a preferably substantially U-shaped slot which surrounds the prong, and the inner side of the prong is provided with a preferably elongated protuberance preferably extending substantially in the circumferential direction of the tubular section and serving to enter a groove of the end portion which has been introduced into the tubular section.

The tubular section and the first end of the prong preferably define an elastic hinge which permits outward flexing of the prong in a direction to extract the protuberance from a groove of the end portion in the tubular section.

At least one of the two substantially circumferentially extending lateral surfaces of the prong can be at least substantially parallel with the preferably elongated rib-shaped protuberance.

The width (as measured in the axial direction of the tubular section) of the first end of the prong can match, be less or can exceed the width of at least one other portion of the prong.

The tubular section of the sleeve has a tube-receiving end which is or can be spaced apart from the prong in the axial direction of the tubular section. The protuberance can be provided with a flank which faces the tube-receiving end, and at least a portion of such flank can slope from the internal surface toward the axis of the tubular section in a direction away from the tube-receiving end.

If the protuberance is elongated in the circumferential direction of the tubular section, its height (as measured in the radial direction of the tubular section) can vary in a direction from one toward the other end of the prong. The protuberance can be spaced apart from the first end of the prong. The aforementioned elastic hinge can be designed in such a way that the prong can be flexed in the radial and axial directions of the tubular section.

At least one of the two circumferentially extending lateral surfaces of the tubular section which bound the slot and flank the prong is or can be inclined from the external surface toward the internal surface of the tubular section in a direction toward the tube-receiving end. This one lateral surface is preferably that surface which is disposed between the prong and the tube-receiving end, and the inclination of the adjacent circumferentially extending lateral surface of the prong is preferably identical or similar to that of the one lateral surface.

At least a portion of one of the lateral surfaces forming part of the tubular section and bounding the slot of the prong is or can be at least substantially parallel to at least a portion of the other lateral surface.

The protuberance can resemble an elongated arcuate tooth which extends in the circumferential direction of the tubular section and has a first flank facing toward and a second flank facing away from the tube-receiving end of the tubular section. The flanks extend substantially circumferentially of the tubular section, and the second flank is or can be steeper than the first flank. For example, the second flank can be substantially normal to the axis of the tubular section or can be undercut to ensure reliable engagement with a rib of the end portion of a tube when the tube is acted upon by a force which tends to extract its end portion from the tubular section. If it is desired to facilitate extraction of the end portion of a tube from the tubular section, the second flank of the protuberance can be designed to make an acute angle with a plane which is normal to the axis of the tubular section.

An end face of the protuberance adjacent one end of the prong can extend substantially radially of the tubular section. Alternatively, such end face can be located in a plane which is substantially parallel to and is spaced apart from the axis of the tubular section.

The dimensions of the slot in the tubular section can be selected in such a way that the second end of the prong has limited freedom of movement in the axial direction of the tubular section. Such second end of the prong is displaced toward the tube-receiving end of the tubular section when the protuberance extends into a groove of the end portion in the tubular section and a pull is exerted upon the end portion in a direction to extract it from the tubular section by way of the tube-receiving end. The protuberance is preferably moved into a plane which is at least substantially normal to the axis of the tubular section in response to displacement of the second end of the prong toward the tube-receiving end of the tubular section.

The preferably U-shaped or nearly U-shaped slot has a first portion between the tube-receiving end of the tubular section and the prong, and a second portion which is separated from the first portion by the prong. The two portions of the slot extend or can extend substantially circumferentially of the tubular section and at least a part of the first portion of the slot can be inclined from the external surface toward the internal surface of the tubular section in a direction toward the tube-receiving end. If the protuberance is spaced apart from the first end of the prong, the aforementioned part of the fist portion of the slot is preferably adjacent the protuberance.

The extent of axial movability of the second end of the prong in the axial direction of the tubular section is dependent upon the width of the adjacent portion of the slot (as measured in the axial direction of the tubular section). Such axial movability of the second end of the prong renders it possible to change the orientation of the protuberance in response to attempted extraction of the end portion of a tube from the tubular section by way of the tube-receiving end, e.g., to move the protuberance to a position in which the area of contact between one flank of the protuberance and the adjacent rib of the tube increases in response to increasing pull or push upon the tube.

The slot can be designed in such a way that it has two substantially parallel portions flanking the prong and extending circumferentially as well as axially of the tubular section. The prong which is flanked by such portions of the slot can have an arcuate shape and extends in the axial as well as in the circumferential direction of the tubular section.

The tubular section can be provided with a projection (e.g., a circumferentially extending crescent-shaped projection) which extends from its internal surface into the adjacent groove of the end portion of a tube in the tubular section, and such projection is or can be disposed substantially diametrically opposite the protuberance at the inner side of the prong. The intermediate portion of the preferably elongated projection is preferably nearer to the axis of the tubular section than the one and/or the other end of the projection.

The inner side of the prong can be provided with a second protuberance which preferably extends circumferentially of the tubular section. The two protuberances can be spaced apart from each other in the axial direction of the tubular section (so that each of these protuberances can enter a different external groove of the end portion of a tube in the tubular section. One of the two protuberances can be provided with a gap which is in line with a portion of the other protuberance (as seen in the axial direction of the tubular section). In other words, at least one of the protuberances can have a plurality of portions separated from one another by gaps and jointly extending in the circumferential direction of the tubular section.

Each protuberance can extend circumferentially of the tubular section along an arc of between approximately ⅓d and 1/5d wherein d is the inner diameter of the tubular section. Alternatively, each protuberance can extend circumferentially of the tubular section along an arc of at least 100 degrees. Such at least one protuberance can extend along an arc which equals or even exceeds 180 degrees.

The tubular section of the sleeve can be provided with an additional slot for an additional prong which can but need not be a mirror image of the first mentioned prong. The arrangement can be such that the first end of one of the prongs is nearer to the first end and more distant from the second end of the other prong. Each prong carries at least one inwardly extending protuberance.

An end face at the second end of each prong can be inclined in such a way that it makes an acute angle with the adjacent portion of the internal surface of the tubular section.

The tubular section of the sleeve is preferably provided with an internal stop for the front face of the end portion of a tube in the tubular section. The prong or prongs of the sleeve are disposed between the tube-receiving end and the stop. The distance between the prong or prongs and the stop preferably equals or exceeds the combined width of a rib and a groove of the end portion in the tubular section, i.e., the end portion of a tube can be pushed into the tubular section to such an extent that at least one of its ribs and at least one of its grooves extends inwardly beyond the prong or prongs.

The stop can be provided with an annular pocket for one or more ribs and one or more groves. The pocket extends substantially axially of the tubular section in a direction away from the tube-receiving end so that its inlet is nearer to the prong or prongs than its bottom end. The stop has confronting inner and outer annular surfaces which bound the pocket, and at least a portion of at least one of these surfaces is or can be inclined toward the other surface in a direction away from the tube-receiving end of the tubular section so as to reduce the radial width of corresponding portion of the pocket. The width of the pocket (as measured in the radial direction of the tubular section) is or can be such that at least one of the inner and outer surfaces is contacted by the end portion which is inserted into the tubular section by way of the tube-receiving end and extends into the pocket.

The stop can include a tubular extension which is surrounded by the inner surface of the stop (i.e., by the annular pocket) and extends axially of the tubular section from the bottom end of the pocket toward the tube-receiving end, at least close to the slot or slots of the tubular section. The thickness of the extension (as measured radially of the tubular section) can increase in a direction from the slot or slots toward the bottom end of the pocket.

The diameter of that portion of the inner surface of the stop which is nearer to the tube-receiving end of the tubular section is or can be smaller than the inner diameter of the end portion in the tubular section, and the diameter of that portion of the inner surface which is nearer to the bottom end of the pocket can equal or exceed the inner diameter of the end portion of the tube. At least a portion of the outer surface of the stop can have a diameter which equals or exceeds the outer diameter of the end portion in the tubular section. The diameter of that portion of the outer surface of the stop which is adjacent the bottom end of the pocket is or can be smaller than the outer diameter of the end portion in the tubular section. The diameter of the maximumdiameter portion of the inner surface of the pocket preferably equals or exceeds the inner diameter of the end portion in the tubular section. Alternatively, the maximum diameter of the inner surface can be smaller than (or need not exceed) the inner diameter of the end portion, and the minimum diameter of the outer surface can equal or exceeds the outer diameter of the end portion.

The novel features which are considered as characteristic of the invention are set forth in particular in the appended claims. The improved fitting itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 4 is an axial sectional view of a second fitting;

FIG. 5 is a transverse sectional view as seen in the direction of arrows from the line V—V of FIG. 4;

FIG. 6 is a side elevational view of the fitting which is shown in FIGS. 4 and 5;

FIGS. 7a to 7f are fragmentary sectional views of prongs showing different shapes of protuberances at the inner sides of the prongs;

DESCRIPTION OF PREFERRED EMBODIMENTS

Figure 1:
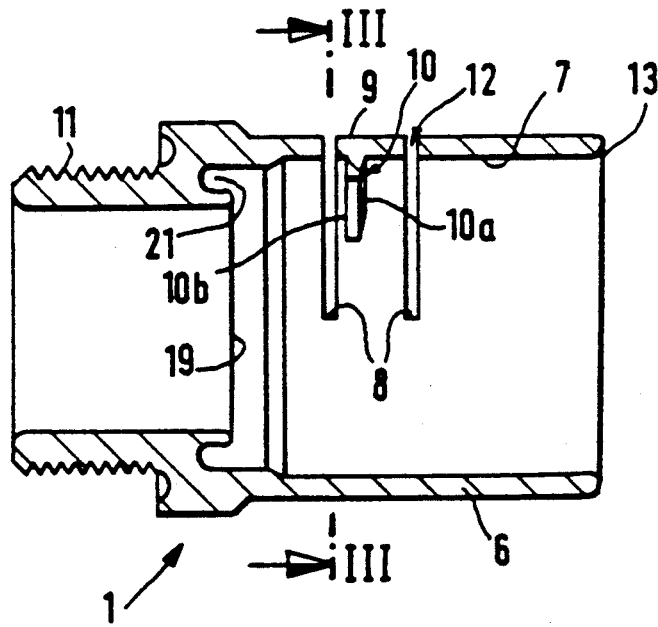
FIG. 1 is an axial sectional view of a fitting which embodies one form of the invention.
Figure 2:
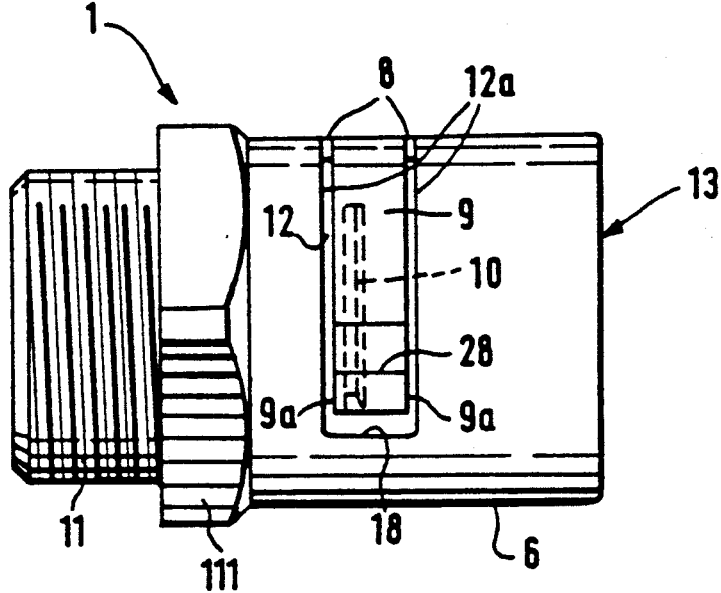
FIG. 2 is a side elevational view of the fitting.
Figure 3:
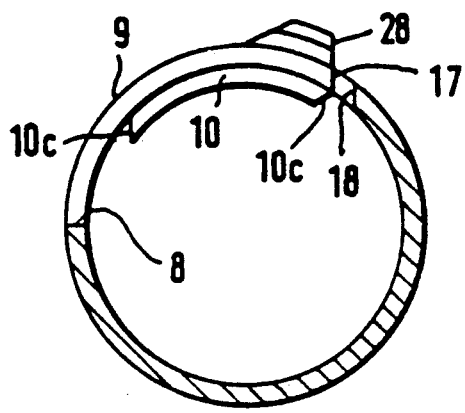
FIG. 3 is a transverse sectional view as seen in the direction of arrows from the line III—III of FIG. 1.

FIGS. 1 to 3 show a fitting which is a one-piece sleeve 1 having a tubular main section 6 and a single prong or tongue 9 extending in the circumferential direction of the section 6. The latter has an externally threaded end 11 and a second end 13 which serves to receive the end portion 2a of an externally grooved and ribbed flexible tubular body 2 (see, for example, FIG. 32) or the end portion 3a of an externally ribbed and grooved rigid tubular body 3 (FIG. 36). The tubular section 6 can receive the properly dimensioned end portion of any tubular body (hereinafter called tube for short) as long as the end portion has at least one substantially circumferentially extending external groove (note the grooves 5 in FIGS. 32 to 36). If the tube 2 or 3 has two or more circumferentially extending grooves 5, such grooves alternate with one or more circumferentially extending ribs 4 (FIGS. 32 to 36).

The sleeve 1 is made of a metallic or plastic material which preferably exhibits a certain elasticity in order to ensure that a hinge 8 between the first end of the prong 9 and the tubular section 6 will permit a certain flexing of the prong in order to move its free second end (at 17) radially of the section 6, and preferably to further ensure that the free end of the prong 9 will have limited freedom of movement in the axial direction of the section 6.

The inner side of the prong 9 is provided with a circumferentially extending arcuate rib-shaped protuberance 10 which is spaced apart from the hinge 8 but extends all the way to the free second end of the prong. The width of the protuberance 10 is selected in such a way that the protuberance can be readily received in a circumferentially extending groove 5 of the tube 2 or 3 when the end portion 2a or 3a of such tube has been introduced into the tubular section 6 by way of the tube-receiving end 13. The tubular section 6 has an annular internal stop 19 with an annular pocket 21. The inlet of the pocket 21 is nearer to and the bottom end of the pocket 21 is more distant from the tube-receiving end 13 of the section 6. The pocket 21 may but not always receive a ring-shaped sealing element 20 (FIG. 32) and/or one or more ribs 4 and grooves 5 of the end portion 2a or 3a.

The protuberance 10 extends inwardly beyond the internal surface 7 of the section 6 and can have a constant height (as measured radially of the section 6) and a constant width (as measured axially of the section 6). As can be seen in FIG. 3, the protuberance 10 extends circumferentially of the section 6 along an arc of approximately 90 degrees, i.e., an arc shorter than the inner diameter of the section 6) and the protuberance has two end faces 10c which do not extend radially of the section 6. The illustrated end faces 10c are disposed in planes which are parallel to and spaced apart from the axis of the sleeve 1 and its tubular section 6.

The end face 17 at the free second end of the prong 9 and the adjacent portion of the internal surface 7 of the section 6 make an acute angle. The width of the corresponding portion of a substantially U-shaped slot 12 which is provided in the tubular section 6 and surrounds the prong 9 is selected in such a way that the ridge between the end face 17 of the prong 9 and the adjacent end face 10c of the protuberance 10 can bypass the adjacent edge face 18 of the tubular section 6. This ensures that the free second end of the prong 9 can be moved radially outwardly in order to extract the protuberance 10 from the adjacent groove 5 in the end portion 2a or 3a of a tube 2 or 3 preparatory to extraction of the end portion 2a or 3a from the tubular section 6.

The externally threaded end 11 can be screwed into a housing or casing or into another support (such as the distributor box 27 of FIG. 31) or into the internally threaded end of a second sleeve forming part of a fitting for a tube 2 or 3. Thus, the sleeve 1 can be separably coupled to a complementary coaxial sleeve which has internal threads to mate with those at the externally threaded end 11. Alternatively, the two sleeves can be separably coupled to each other by a bayonet mount or by any other suitable coupling means.

An important advantage of the improved fitting is that the prong 9 as well as its internal protuberance 10 extend in the circumferential direction of the tubular section 6. This renders it possible to employ a relatively short section 6 without affecting the retaining action of the protuberance 10 upon the adjacent external rib 4 of the end portion 2a or 3a of a tube 2 or 3. As explained hereinbefore, the prongs of conventional fittings extend in the axial direction of the tubular section so that they contribute significantly to the axial length of the fitting, especially if the prongs are to exhibit pronounced flexibility which, as a rule, is achievable only by lengthening the prongs. The prong 9 of FIGS. 1 to 3 has two parallel lateral surfaces 9a disposed in planes which are normal to the axis of the sleeve 1 and its tubular section 6. The same applies for the two parallel surfaces 12a which form part of the section 6 and bound the adjacent circumferentially extending portions of the slot 12. The width of the two circumferentially extending portions of the slot 12 is or can be the same, at least when the prong 9 is free to assume its starting or unstressed position which is shown in FIGS. 1 and 2. The extent to which the protuberance 10 can change its orientation in response to the application of a force by the adjacent rib 4 (i.e., the extent to which the free second end of the prong 9 can move axially of the tubular section 6 toward or away from the tube-receiving end 13) depends on the width of the adjacent portions of the slot 12.

The illustrated prong 9 has a radially outwardly extending handle 28 which is adjacent its free second end and can be engaged by one or two fingers to move the free end of the prong radially outwardly so that the protuberance 10 can be extracted from the adjacent groove 5 or is simply moved radially outwardly in order to permit convenient insertion of the end portion 2a or 3a into the sleeve 1, preferably all the way into abutment with the stop 19. The distance of the stop 19 from the protuberance 10 is preferably selected in such a way that the protuberance is in register with an external groove 5 when the end portion 2a but particularly the non-deformable (or less readily deformable) end portion 3a reaches the stop. Furthermore, the distance of the stop 19 from the prong 9 is preferably such that it at least equals or exceeds the combined width of a rib 4 and a groove 5, i.e., that at least one rib and at least one groove of the end portion 2a or 3a will be located between the pocket 21 and the protuberance 10 when the latter extends into a groove 5 to reliably but separably couple a tube 2 or 3 to the sleeve 1.

The feature that the tubular section 6 is or can be relatively short (because the space requirements of the prong 9 and its protuberance 10 in the axial direction of the sleeve 1 are very small and, in fact, negligible) is particularly important when the space which is available for a fitting does not suffice to accommodate a relatively long tubular section with axially extending prongs of the type used in conventional fittings.

The protuberance 10 is more closely adjacent one than the other circumferentially extending lateral surface 9a of the prong 9. However, it is equally within the purview of the invention to provide the protuberance 10 adjacent that lateral surface 9a which is nearer the tube-receiving end 13 of the tubular section 6 or to provide the protuberance substantially midway between the lateral surfaces 9a.

The flexibility of the prong 9 can be enhanced by reducing the thickness of that portion of the sleeve 1 which constitutes the hinge 8. In other words, the thickness (as measured radially of the section 6) of the prong 9 or of the major portion of the prong can exceed the thickness of the hinge 8. This enhances the flexibility of the prong 9 at 8 without weakening that portion which carries the protuberance 10. Some axial movability of the free end of the prong 9 is desirable and advantageous in many instances because this enables the one or the other lateral surface 9a to come into actual abutment with the adjacent surface 12a of the tubular section 6 so that the prong 9 and its protuberance 10 can more reliably resist extraction of the end portion 2a or 3a or further inward movement of the end portion 2a or 3a (toward the externally threaded end 11). As mentioned above, the extent of axial movability of the free end of the prong 9 is determined by the width of adjacent circumferentially extending portions of the slot 12. The deformability of the sleeve 1 in the region of the hinge 8 can be readily selected in such a way that a large portion of one of the lateral surfaces 9a moves into abutment with the adjacent lateral surface 12a in order to reliably an effectively oppose further penetration of the end portion 2a or 3a into, or extraction of such end portion from, the tubular section 6.

FIG. 1 shows that the right-hand flank 10a of the protuberance 10 (namely the flank which faces toward the tube-receiving end 13) slopes from the internal surface 7 toward the axis of the tubular section 6 in a direction away from the tube-receiving end 13. This facilitates introduction of the end portion 2a or 3a into the section 6, even without exerting a pull upon the handle 28 in a direction to withdraw the free second end of the prong 9 from the slot 12. The flank 10a then acts as a cam face and enables the front face of the end portion 2a or 3a (particularly the front face of the end portion 3a) to displace the protuberance 10 radially outwardly. The innate elasticity of the material of the sleeve 1 suffices to enable the hinge 8 to return the free second end of the prong 9 into the slot 12 so that the protuberance 10 enters the adjacent groove 5 and retains the end portion 2a or 3a in the tubular section 6. The other flank 10b of the protuberance 10 which is shown in FIGS. 1 to 3 is located in a plane which is at least substantially normal to the axis of the sleeve 1; this enhances the ability of the protuberance to effectively resist extraction of the end portion 2a or 3a from the tubular section 6 except when the operator decides to pull or otherwise move the handle 28 away from the axis of the sleeve 1 for the express purpose of permitting extraction of the end portion 2a or 3a.

A polygonal (e.g., hexagonal) intermediate portion 111 of the sleeve 1 adjacent the externally threaded end 11 serves to facilitate the application of a wrench or another suitable implement in order to screw the end 11 into the tapped bore of a housing, box or other suitable support or to permit convenient detachment of the sleeve 1 from its support.

In contrast to conventional fittings with axially extending prongs, the pivot axis which is defined by the hinge 8 is parallel or nearly parallel to the axis of the sleeve 1. This is due to the fact that the prong 9 extends in the circumferential direction of the section 6 to thus permit a considerable reduction of axial length of the sleeve 1. If a further reduction of axial length of the sleeve 1 is desirable or necessary, the width of the prong 9 (as measured in the axial direction of the section 6) can be reduced so that it only slightly exceeds or does not exceed the width of the protuberance 10. Thus, and if the width of the prong 9 does not exceed the width of the adjacent radially outermost portion of the protuberance 10, the lateral surfaces 9a of the prong can be said to constitute extensions of the respective flanks 10a, 10b of the protuberance 10. The one-piece protuberance 10 can be replaced with a row of stud- or pin-shaped discrete protuberances without departing from the spirit of the invention. A composite or multi-piece protuberance will be described with reference to FIGS. 9-10 and 13-14.

It is not always necessary to select the initial orientation of the protuberance 10 in such a way that the protuberance is not located in a plane extending exactly at right angles to the axis of the section 6. The reason is that, if the end portion (2a) in the section 6 is at least slightly deformable, the rib 5 which engages the flank 10a or 10b of the protuberance 10 in the adjacent external groove 5 can yield and comes in full surface-to-surface abutment with the protuberance even if the orientation of the protuberance is not changed in response to a pull in a direction to extract a deformable end portion 2a from or in response to a push in a direction to move the deformable end portion 2a deeper into the section 6. Movability of the free second end portion of the prong 9 in the axial direction of the section 6 is particularly desirable when the material of the end portion (3a) which has been introduced into the section 6 is rigid so that large-area contact between a non-deformable rib and the flank 10a or 10b of the protuberance 10 can be achieved in response to a normally very small change in orientation of the protuberance relative to a plane extending at right angles to the axis of the sleeve 1.

FIGS. 4 to 6 show a modified fitting wherein the prong 9 has an arcuate shape and extends circumferentially as well as axially of the tubular section 6. All such parts of this fitting which are identical with or clearly analogous to corresponding parts of the fitting of FIGS. 1 to 3 are denoted by similar reference characters. The same applies for all other illustrated embodiments of the improved fitting. The circumferentially extending lateral surfaces 9a of the prong 9 of FIGS. 4 to 6 are parallel to adjacent circumferentially extending lateral surfaces 12a of the tubular section 6; however, the surfaces 9a and 12a are not located in planes which are normal to the axis of the sleeve 1 because each of these surfaces is inclined from the external surface toward the internal surface 7 of the section 6 in a direction toward the tube-receiving end 13. The protuberance 10 at the inner side of the arcuate prong 9 extends in the circumferential direction of the section 6 and is disposed in a plane which is at least substantially normal to the axis of the sleeve 1, at least when the flank 10b of the protuberance is acted upon by a rib 4 in a direction to move the protuberance toward the end 13 of the section 6. The prong 9 extends circumferentially of the section 6 along an arc of nearly 180 degrees; in fact, the arc can exceed 180 degrees.

The protuberance 10 can but need not extend all the way between the hinge 8 and the free second end of the prong 9; it is preferred to have the protuberance terminate short of the hinge 8, especially if the height of the protuberance in the radial direction of the section 6 is constant. This renders it possible to extract the entire protuberance 10, or at least the major portion of this protuberance, into and radially outwardly beyond the slot 12 in response to a relatively short radially outward movement of the free second end of the prong 9.

The prong 9 of FIGS. 4 to 6 does not have a handle 28, i.e., such handle is optional. The free second end of this prong can be moved away from the axis of the sleeve 1 by the working end of a screwdriver or another suitable rudimentary tool which is inserted into the narrow intermediate portion of the slot 12 adjacent the edge face 18 of the tubular section 6.

The width of the arcuate prong 9 in the axial direction of the sleeve 1 can but need not be constant. In the fitting of FIGS. 4 to 6, the width of the prong 9 increases gradually from the hinge 8 toward or all the way to the end face 18. Thus, the width of one end of the prong 9 need not match the width of the other end. A prong which is narrower in the region of the hinge 8 is preferred at this time because this enhances the flexibility of the prong in the region of the hinge without the need to reduce the thickness of the material of tubular section 6 at the hinge. The hinge 8 can undergo some bulging or similar deformation when the protuberance 10 is acted upon by a rib 4 which tends to move the free second end of the prong 9 axially of the section 6 in order to move the one or the other lateral surface 9a into preferably large-area contact with the adjacent surface 12a.

An advantage of the fitting of FIGS. 4 to 6 is that the area of each of the lateral surface 9a and 12a is increased (as compared with the similarly referenced surfaces in the fitting of FIGS. 1 to 3) without appreciably increasing the space requirements of the (arcuate) prong 9 in the axial direction of the sleeve. Relatively large surfaces 9a and 12a are desirable when the protuberance 10 is acted upon by large forces tending to move the end portion 2a or 3a deeper into or to extract the end portion 2a or 3a from the section 6. The inclination of the surfaces 9a and 12a in the fitting of FIGS. 4 to 6 toward the tube-receiving end 13 also increases the area of such surfaces and hence to the ability of the arcuate prong 9 to prevent excessive changes of orientation of the protuberance 10 under the action of the adjacent rib 4.

Depending upon the configuration of the flank 10b, the application of axial stresses upon the protuberance 10 in a direction to move the free second end of the prong 9 toward the tube-receiving end 13 of the section 6 can result in radial displacement of the free end of the prong when the right-and lateral surface 9a of FIG. 6 already abuts the adjacent lateral surface 12a. Such radially inward movement of the free second end of the prong 9 is terminated automatically as soon as the free second end of the prong strikes the adjacent rib or ribs 4 and/or as soon as the inner side of the protuberance 10 abuts the surface at the bottom of the registering groove 5. In other words, it is possible to design the protuberance 10 in such a way that it tends to move the free second end of the prong 9 radially inwardly whenever the protuberance is acted upon by a rib 4 which tends to move toward the tube-receiving end 13. This is desirable and advantageous because the prong 9 and its protuberance 10 are even less likely to become accidentally disengaged from the properly inserted end portion 2a or 3a.

In each of the illustrated embodiments, the initial orientation of the protuberance 10 can be such that its flank 10b is in relatively small-area contact with the adjacent rib 4 when the rib does not tend to move toward the tube-receiving end 13. However, if the rib 4 urges the protuberance 10 toward the end 13 of the section 6, the orientation of the prong 9 and of its protuberance changes so that the area of contact between the flank 10b and the adjacent rib 4 increases. Thus, the area of contact between the protuberance 10 and the adjacent rib 4 can increase proportionally with an increase of the force which tends to extract the end portion 2a or 3a from the section 6. Analogously, a rib 4 abutting the flank 10a can change the orientation of the protuberance 10, and hence the area of contact between the flank 10 and the adjacent rib, if the end portion 2a or 3a exerts a pronounced force in a direction to urge its front face against the stop 19.

FIG. 7a shows a protuberance 10 with two mirror symmetrical flanks 10a, 10b each of which makes an acute angle with a plane extending at right angles to the axis of the respective sleeve 1 and tubular section 6. The inclined flank 10a facilitates insertion of the end portion 2a or 3a of a tube 2 or 3 into the tubular section 6, and the flank 10b facilitates extraction of the end portion 2a or 3a from the tubular section. The protuberance 10 simply rides over successive ribs 4 during insertion of an end portion 2a or 3a into or during extraction of an end portion 2a or 3a from the tubular section 6 of the respective fitting. The inclination of the flank 10a and/or 10b can be constant from one end to the other end of the protuberance 10. Alternatively, the inclination at the one and/or the other end of the protuberance 10 can be different than the inclination at the center. The exact inclination of the flank 10a and/or 10b will depend upon the material of the sleeve 1, upon the thickness of the hinge 8, upon the anticipated magnitude of forces which are to act upon the protuberance, and upon the desired resistance of the prong 9 to expulsion of its protuberance from a groove 5.

FIG. 7b shows that the slope of a portion of the flank 10a is more pronounced than the slope of the flank 10b; this facilitates insertion of the end portion 2a or 3a while the flank 10b enables the protuberance 10 to offer a greater resistance to extraction of the end portion 2a or 3a.

FIG. 7c shows that the slope of the entire flank 10a is more pronounced than that of the flank 10b and that the latter is located in a plane which is at least substantially normal to the axis of the sleeve 6. This protuberance offers an even greater resistance to extraction of the end portion 2a or 3a from the tubular section 6 of the sleeve 1.

FIG. 7d shows a portion of a protuberance 10 which differs from the protuberance of FIG. 7c in that the flank 10b is actually undercut, i.e., it is disposed in a plane which slopes radially inwardly toward the axis and away from the tube-receiving end 13 of the tubular section 6. Such undercut flange 10b can be satisfactorily engaged by the external rib 4 of a deformable tube 2, for example, an elastic hose, to establish a highly reliable force- and form-locking connection which offers a pronounced resistance to extraction of the end portion 2a or 3a from the tubular section 6.

FIG. 7e shows a modification of the protuberance 10 of FIG. 7d; the flank 10b is undercut (i.e., it makes an acute angle with the adjacent portion of the inner side of the prong 9) and the flank 10a is positioned in such a way that the substantially tooth-shaped protuberance of FIG. 7e does not have a pronounced top land because the flanks 10a and 10b define a sharp edge at the radially innermost part of the protuberance. The protuberances of FIGS. 7a to 7d have a substantially trapeziform cross-sectional outline and the protuberance of FIG. 7e has a substantially triangular cross-sectional outline.

The slope of the flank 10a on the protuberance of FIG. 7f is even more pronounced and the height of the protuberance in the radial direction of the tubular section is less pronounced than in the protuberances of FIGS. 7a to 7e. The protuberance of FIG. 7f can be used with particular advantage to facilitate convenient introduction of the end portion 3a of a rigid tube 3. The front face of the end portion 3a can simply displace the protuberance of FIG. 7f radially outwardly while moving toward the internal stop of the respective tubular section.

Figure 8:
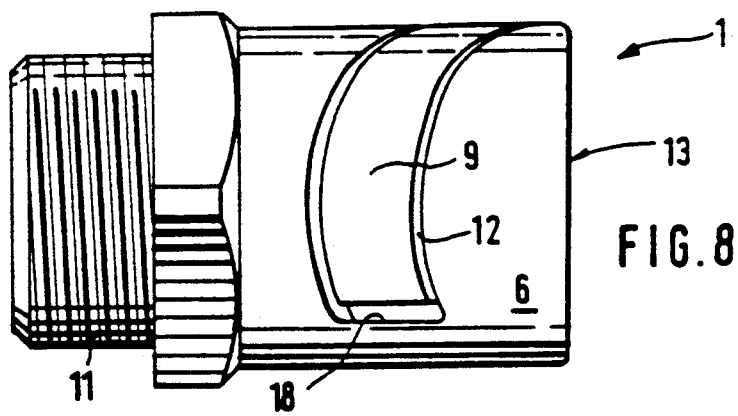
FIG. 8 is a side elevational view of a fitting with an arcuate prong which extends circumferentially and axially of the tubular section along an arc of at least close to 180 degrees.

FIG. 8 shows a fitting which is identical with or very similar to the fitting of FIGS. 4 to 6. The only important difference is that the prong 9 of FIG. 8 extends along an arc which is longer than that shown in FIG. 6. For example, the prong 9 of FIG. 8 can extend along an arc of between 180 and 270 degrees.

Figure 9:
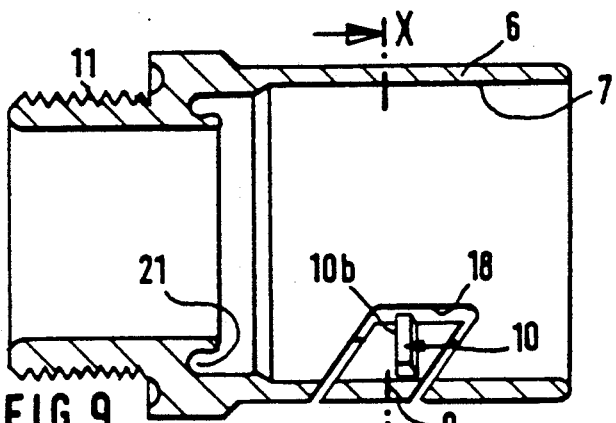
FIG. 9 is an axial sectional view of a further fitting.
Figure 10:
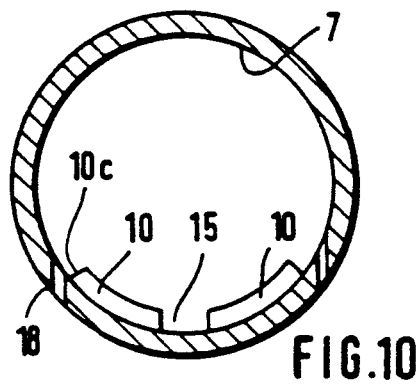
FIG. 10 is a transverse sectional view as seen in the direction of arrows from the line X—X of FIG. 9.

FIGS. 9 and 10 illustrate a fitting which is similar to or substantially identical with the fitting of FIGS. 4 to 6 except that its protuberance 10 comprises several portions (FIG. 10 shows two portions) which are spaced apart from one another in the circumferential direction of the tubular section 6. The reference character 15 denotes in FIG. 10 a gap between the two portions of the composite two-piece protuberance 10. When the flank 10b of the two-piece protuberance 10 of FIGS. 9 and 10 is acted upon by the adjacent circumferentially extending rib 4 of a deformable tube 2 (e.g., an elastic hose), the material of such rib tends to penetrate into the gap 15 to thus reduce the likelihood of angular displacement of the tubular section 6 relative to the tube 2 and/or vice versa. Moreover, as the material of a deformable end portion 2a tends to move radially outwardly and into the gap 15 (when the composite protuberance 10 of FIGS. 9 and 10 is urged toward the tube-receiving end 13 of the section 6), this also enhances the retaining or blocking action of the protuberance, probably due to an increase of the area of contact between the protuberance and the rib 4 bearing upon the flank 10b.

Figure 11:
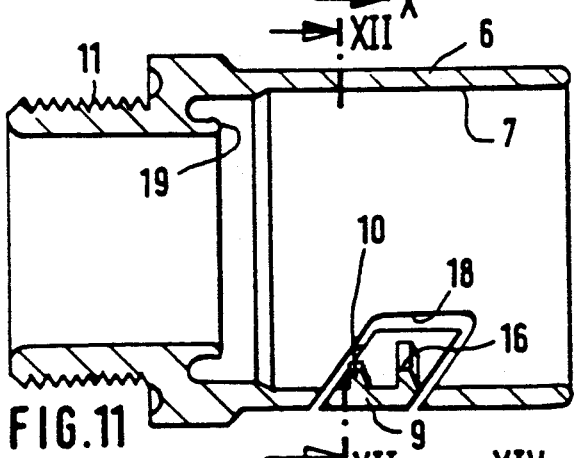
FIG. 11 is an axial sectional view of another fitting.
Figure 12:
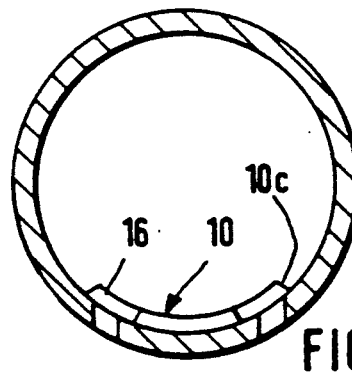
FIG. 12 is a transverse sectional view as seen in the direction of arrows from the line XII—XII of FIG. 11.

FIGS. 11 and 12 show a fitting wherein the inner side of the prong 9 is provided with two protuberances 10 and 16. The two protuberances are spaced apart from each other in the axial direction of the section 6, and the mutual spacing of these protuberances is such that each thereof enters a different groove 5, i.e., at least one rib 4 can be disposed between the protuberances 10 and 16. The length of one of these protuberances can exceed the length of the other protuberance (as seen in the circumferential direction of the section 6). Moreover, the cross-sectional outline of the protuberance 10 may but need not match the cross-sectional outline of the protuberance 16. for example, the flanks of the protuberance 10 can be inclined in such a way that one of these flanks offers a pronounced resistance to extraction of an end portion 2a or 3a from the section 6. On the other hand, one of the flanks of the protuberance 16 can be designed to offer a pronounced resistance to further penetration of the end portion 2a or 3a into the section 6, i.e., toward or against the stop 19.

Figure 13:
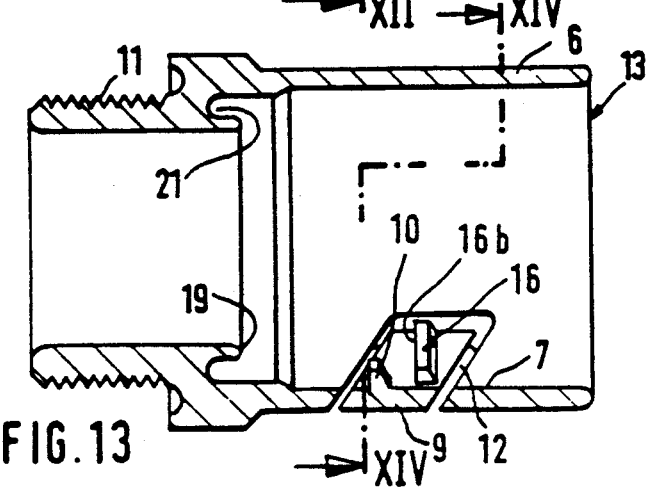
FIG. 13 is an axial sectional view of a further fitting.
Figure 14:
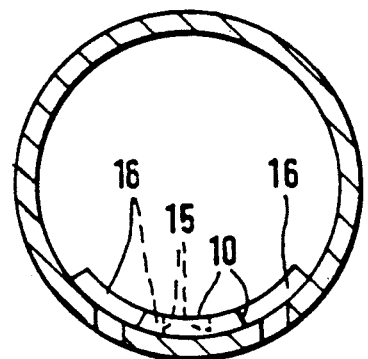
FIG. 14 is a transverse sectional view substantially as seen in the direction of arrows from the line XIV—XIV of FIG. 13.

The fitting of FIGS. 13 and 14 is practically identical with the fitting of FIGS. 11–12 except that the longer protuberance 16 includes two portions which are separated by a gap 15 and the gap 15 is located in front of the median portion of the protuberance 10 as seen in a direction from the tube-receiving end 13 toward the stop 19 of the tubular section 6. This fitting exhibits the advantages of the fittings of FIGS. 9–10 and FIGS. 11–12. As mentioned above, if the end portion 2a in the tubular section 6 is deformable, its material tends to penetrate radially outwardly to enter the gap 15 and to thus contribute to more reliable retention of the end portion 2a in the section 6 when the rib 4 between the two protuberances bears against the flank 16b of the protuberance 16. At the same time, one of the protuberances 10, 16 of FIGS. 13–14 can offer a pronounced resistance to further penetration of the end portion 2a into the section 6 while the other protuberance is designed to offer very pronounced resistance to extraction of the end portion 2a by way of the tube-receiving end 13.

Each of the protuberances 10, 16 can be provided with one or more gaps 15. Alternatively, one or more gaps 15 can be provided in the protuberance 10 to register with portions of a one-piece elongated protuberance 16. The tendency of a rib 4 between the protuberances 10, 16 to penetrate into the gap 15 of one protuberance causes such rib to bear with an even greater force against the other protuberance to thus ensure a desirable distribution of stresses to both protuberances.

The length of a protuberance 10 or 16 in the circumferential direction of the tubular section 6 preferably at least equals one-fifth of the inner diameter d of the tubular section 6 but can equal or exceed one-fourth or one-third of such diameter. In fact, the length of the protuberance 10 or 16 can equal or exceed the diameter d and, as already mentioned above (and as shown in FIGS. 6 and 8) can approximate or exceed half the circumference of the section 6. The tongue 9 of FIG. 3 extends along an arc of between 90 and 180 degrees, and the protuberance 10 of this prong extends along an arc of approximately 90 degrees (as seen in the circumferential direction of the section 6). The prong 9 of FIG. 6 is longer (close to 180 degrees) than the prong 9 of FIG. 3, and the prong 9 of FIG. 8 is still longer; it can extend along an arc of up to and even in excess of 180 degrees.

Figure 15:
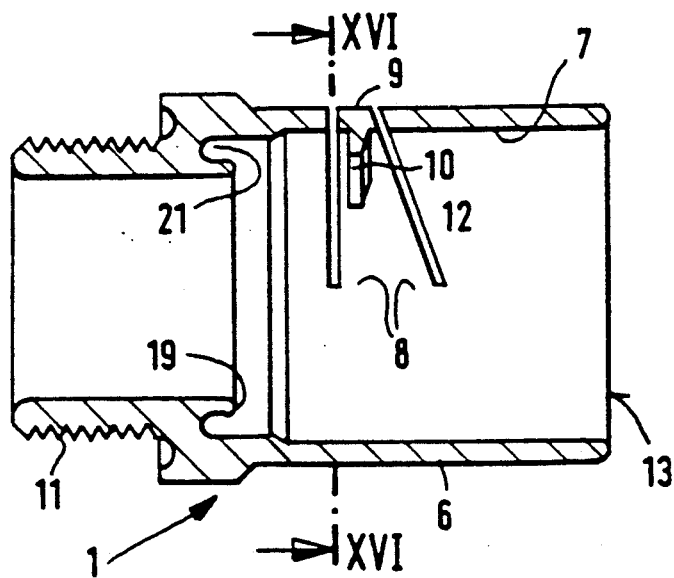
FIG. 15 is an axial sectional view of another fitting.
Figure 16:
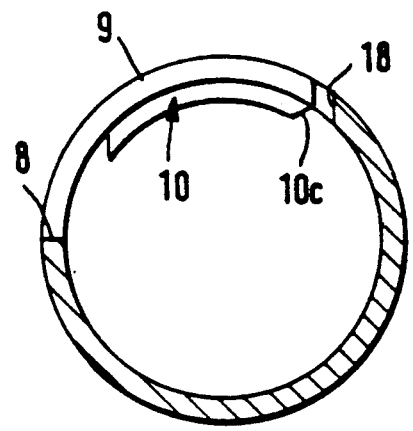
FIG. 16 is a transverse sectional view as seen in the direction of arrows from the line XVI—XVI of FIG. 15.
Figure 17:
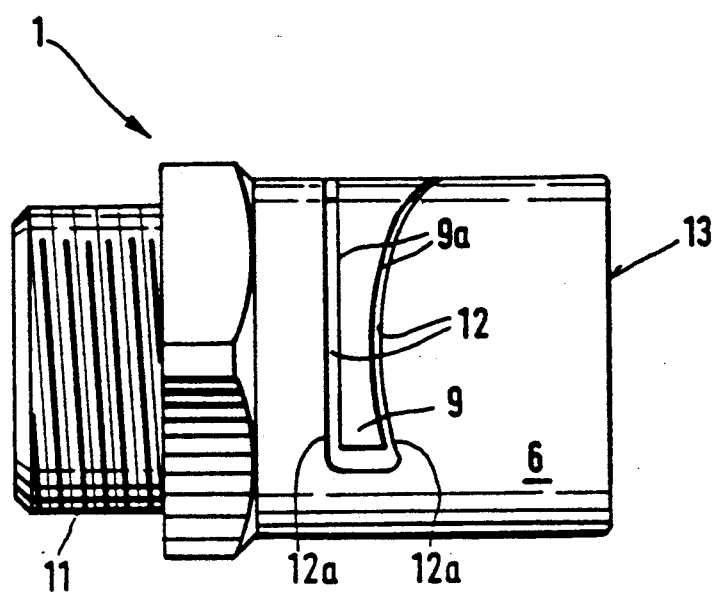
FIG. 17 is an elevational view of a fitting with a prong having a narrower median portion and wider ends.

FIGS. 15 to 17 show a further fitting wherein the width of the prong 9 varies within a wide range, first in a direction from the hinge 8 toward an intermediate portion and thereupon again from the intermediate portion toward the free second end. The length of the prong 9 in the circumferential direction of the section 6 is well in excess of 90 degrees. The width of this prong decreases gradually in a direction away from the hinge 8 to thereupon gradually increase in a direction toward the free second end, i.e., toward the edge face 18 of the section 6. The protuberance 10 is located in a plane which is substantially normal to the axis of the sleeve 1. The variation in the width of the prong 9 is achieved in that the left-hand lateral surface 9a of FIG. 17 is located in a plane which is normal to the axis of the sleeve 1 whereas the right-hand lateral surface 9a has a concave shape, i.e., it extends axially and circumferentially of the section 6 to thus ensure the establishment of large-area contact with the adjacent surface 12a in the slot 12. In all other respects, the fitting of FIGS. 15 to 17 is or can be identical with the fitting of FIGS. 1 to 3.

Figure 18:
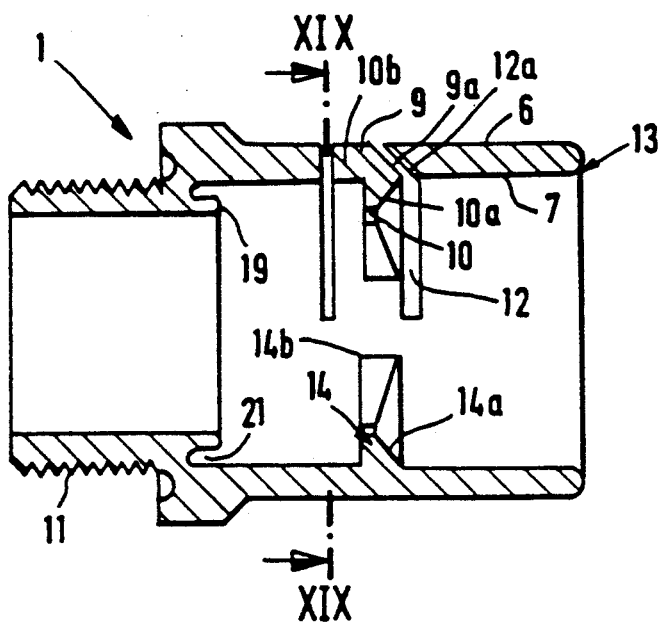
FIG. 18 is an axial sectional view of a further fitting.
Figure 19:
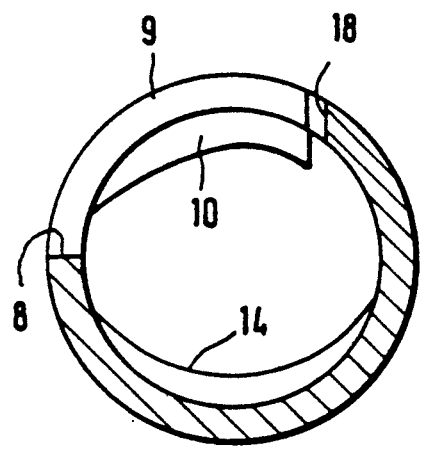
FIG. 19 is a transverse sectional view as seen in the direction of arrows from the line XIX—XIX of FIG. 18.
Figure 20:
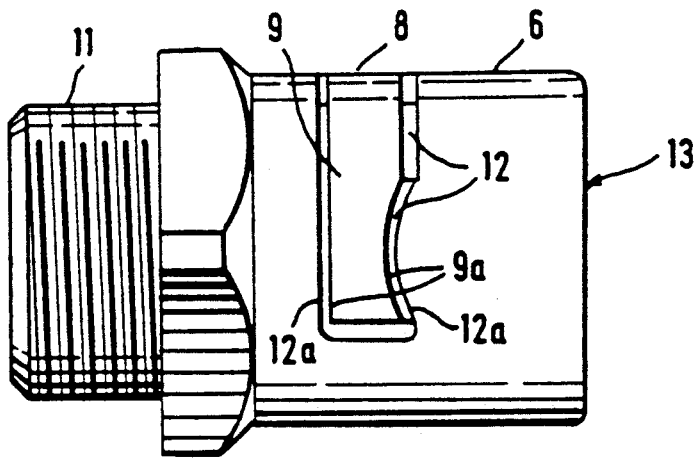
FIG. 20 is an elevational view of the fitting which is shown in FIGS. 18 and 19.

The fitting of FIGS. 18 to 20 is similar to the fitting of FIGS. 15 to 17 except that the prong 9 includes a first portion of constant width (in the axial direction of the section 6) which is adjacent the hinge 8, and a second portion of varying width which extends from the portion of constant width all the way to the free second end of the prong. This is achieved by providing the prong 9 with a first lateral surface 9a which is located in a plane extending at right angles to the axis of the sleeve 1, and with a second lateral surface 9a which is in part concave (adjacent the free second end of the prong 9) and in part parallel to the first surface 9a (adjacent the hinge 8). The width of the substantially U-shaped slot 12 which is shown in FIG. 20 is not or need not be constant; this slot has a somewhat greater width at the free second end of the prong 9 and adjacent the right-hand end of the hinge 8. The width of the slot 12 is selected with a view to permit limited movements of the free second end of the prong 9 in the axial direction of the section 6 in order to ensure that the one or the other lateral surface 9a can be moved into large-area contact with the adjacent surface 12a. Those portions of the surfaces 9a, 12a which are concave (as seen in FIG. 20) preferably slope from the external surface toward the internal surface 7 of the section 6 in a direction toward the tube-receiving end 13. This can be readily seen in FIG. 18.

The fitting of FIGS. 18 to 20 further comprises a fixed substantially crescent-shaped internal protuberance 14 (hereinafter called projection to distinguish from the protuberance 10 at the inner side of the prong 9) which is located substantially diametrically opposite the protuberance 10. The projection 14 is integral with and extends radially inwardly from the internal surface 7 of the tubular section 6, and the axial position of this projection can be selected in such a way that it is receivable in that groove 5 of an end portion 2a or 3a which also receives the protuberance 10. Introduction of the end portion 2a or 3a into the section 6 by way of the end 13 is facilitated in that the height of the projection 10 (as measured radially of the section 6) decreases from both ends toward the intermediate or median portion of the projection. In addition, the height of the protuberance 10 also varies, namely the height decreases in a direction from the free second end of the prong 9 toward the hinge 8. Therefore, only a relatively small radially outward movement of the free second end of the prong 9 is necessary in order to move the entire protuberance 10 radially outwardly beyond the internal surface 7 prior to introduction of the end portion 2a or 3a.

The projection 14 assists the protuberance 10 in resisting undesired extraction of the end portion 2a or 3a from the section 6 or excessive bias of the inserted end portion 2a or 3a against the internal stop 19. The flanks 14a, 14b of the projection 14 can be similar to the corresponding flanks 10a, 10b of the protuberance 10 which is shown in FIG. 7a, 7b, 7c, 7d, 7e or 7f. Furthermore, the flanks of the projection 14 can but need not be identical with the flanks of the protuberance 10 of FIGS. 18-20.

The feature which is shown in FIG. 19, namely that the depth of the protuberance 10 decreases in a direction from the free second end toward the first end of the prong 9 (i.e., toward the hinge 8) and that the protuberance 10 terminates short of the hinge 8, is particularly desirable when the fitting is to be repeatedly attached to and detached from the end portion 2a or 3a of a tube 2 or 3. Such design of the protuberance 10 ensures that a relatively short movement of the free second end of the prong 9 suffices to extract the entire protuberance from the interior of the section 6 in order to permit convenient introduction or extraction of an end portion 2a or 3a. Moreover, such design of the protuberance 10 reduces the likelihood of premature fatigue of the material of the hinge 8 because the hinge need not be designed to permit extensive movements of the prong 9 about an axis which is parallel to the axis of the section 6. The elasticity of the material of the hinge 8 should be sufficiently pronounced to ensure that the hinge invariably tends to maintain the protuberance 10 in the interior of the section 6, i.e., in the adjacent external groove 5 of an end portion 2a or 3a.

The feature that the hinge 8 permits some movements of the free second end portion of the prong 9 in the axial direction of the section 6 is desirable on the additional ground that it reduces the likelihood of premature destruction of or damage to the hinge in response to stressing of the protuberance 10 in a direction toward or away from the tube-receiving end 13 of the section 6. Thus, the hinge 8 can yield and enables the one or the other lateral surface 9a of the prong 9 to bear against the adjacent surface 12a in the slot 12. At such time, further stressing of the material of the hinge 8 is not possible because the abutting lateral surfaces 9a, 12a cooperate to ensure that additional stresses are transmitted from the prong 9 directly to the section 6.

The aforediscussed inclination of one or both lateral surfaces 9a and of one or both lateral surfaces 12a with reference to a plane which is normal to the axis of the section 6 also contributes to reliability of retaining action of the protuberance 10. For example, by inclining the two right-hand lateral surfaces 9a, 12a of FIGS. 18 and 20, the designer of the fitting ensures that a pull upon the end portion 2a or 3a of a tube 2 or 3 in a direction to extract the end portion from the section 6 will result in a tendency of the right-hand surface 9a to slide along the adjacent surface 12a in a direction toward the axis of the section 6, i.e., to move the protuberance 10 radially inwardly and hence deeper into the adjacent external groove 5. The just described tendency of the prong 9 to move radially inwardly in response to a pull upon the properly inserted end portion 2a or 3a of a tube 2 or 3 can be enhanced by enlarging the right-hand lateral surfaces 9a and 12a of FIGS. 18 and 20, e.g., by configuring the slot 12 in a manner as shown in FIGS. 4 to 6 and in FIG. 8.

The making of slots 12 of the type shown in FIGS. 4-6 is less expensive than the making of slots of the type shown in FIG. 20. As a rule, it suffices to provide the prong 9 with a single concave or partly concave lateral surface 9a and to provide the section 6 with a single convex or partly convex lateral surface 12a adjacent the concave surface 9a, preferably in the region of the protuberance 10 (FIG. 20). Such concave and convex surfaces 9a, 12a are normally those between the tube-receiving end 13 of the section 6 and the protuberance 10 because it is much more likely that a properly inserted end portion 2a or 3a will be subjected to a pronounced pull, i.e., to the action of a force tending to extract the end portion from the section 6 by way of the end 13. At such time, the complementary concave and convex lateral surfaces 9a, 12a cooperate to transmit forces from the prong 9 directly to the section 6, rather than by way of the hinge 8, as soon as the free second end portion of the prong 9 has been caused to move axially toward the tube-receiving end 13 in order to move its concave or partly concave lateral surface 9a into large-area abutment with the adjacent convex or partly convex lateral surface 12a. It will be noted that the width of the portion of the slot 12 between the concave and convex portions of the right-hand lateral surfaces 9a, 12a of FIG. 20 is less than the width of the same slot portion adjacent the hinge 8. This ensures that a relatively short travel of the free second end portion of the prong 9 suffices to move its concave or partly concave surface 9a into desirable abutment with the adjacent surface 12a.

The length of the prong 9, its spring characteristic, the configuration of its lateral surfaces 9a, the configuration of the adjacent lateral surfaces 12a of the section 6, the elasticity of the hinge 8 and/or many other parameters will be selected in dependency on the intended use of the fitting, in dependency on the nature and purpose of the tube 2 or 3 as well as in dependency on the anticipated magnitude of forces which are to be taken up by the protuberance 10 for transmission to the section 6 by way of the hinge 8 or directly by way of one of the surfaces 12a.

The reason that the projection 14 is preferably located diametrically opposite the protuberance 10 is that each of the parts 10, 14 can take up approximately one-half of the force which is transmitted thereto by an adjacent rib 4 and that these parts transmit forces to spaced-apart portions of the section 6. Such symmetric distribution of forces to the projection 14 and protuberance 10 is desirable and advantageous and is also less likely to result in one-sided deformation of an elastically or otherwise deformable rib 4 which bears against the parts 10, 14 when the fitting is in actual use.

Figure 21:
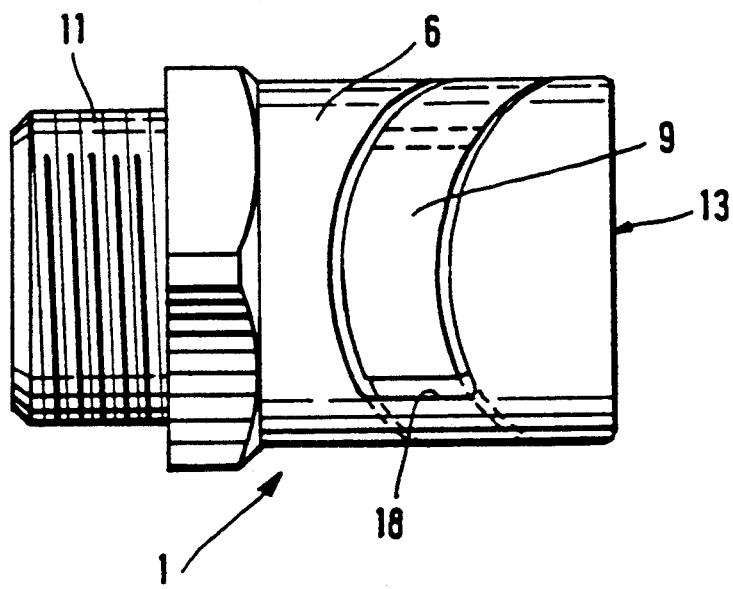
FIG. 21 is an elevational view of a fitting which has several prongs.
Figure 22:
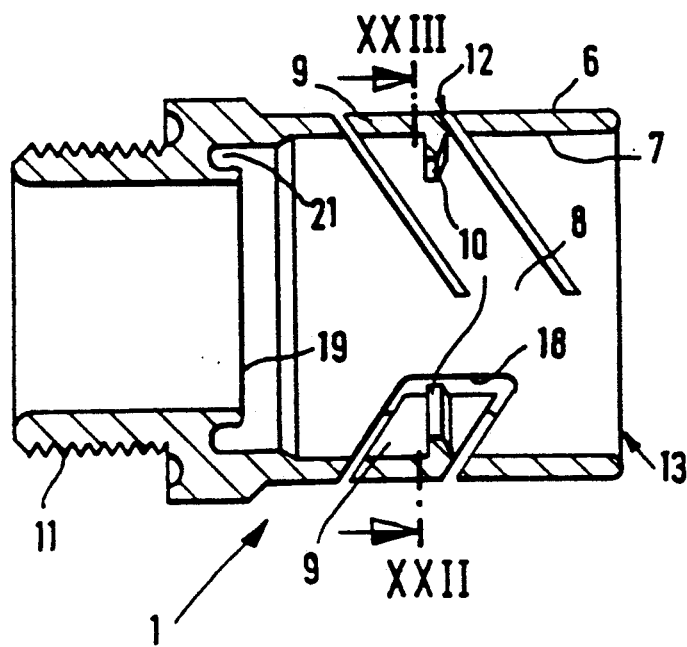
FIG. 22 is an axial sectional view of the fitting which is shown in FIG. 21.
Figure 23:
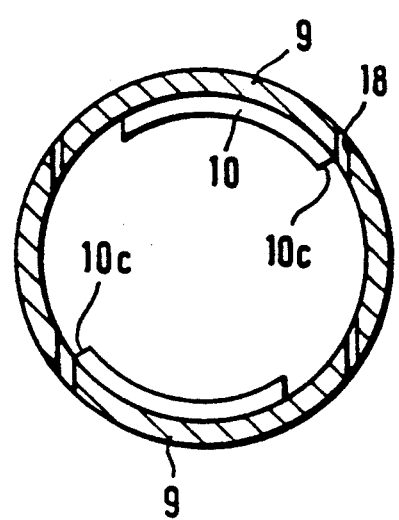
FIG. 23 is a transverse sectional view as seen in the direction of arrows from the line XXIII—XXIII of FIG. 22.
Figure 24:
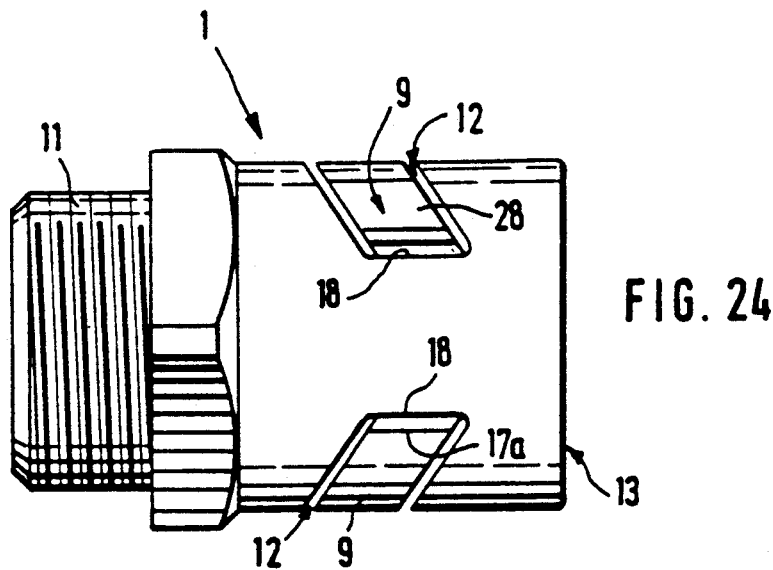
FIG. 24 is an elevational view of a fitting constituting a modification of the fitting which is shown in FIGS. 21 to 23.
Figure 25:
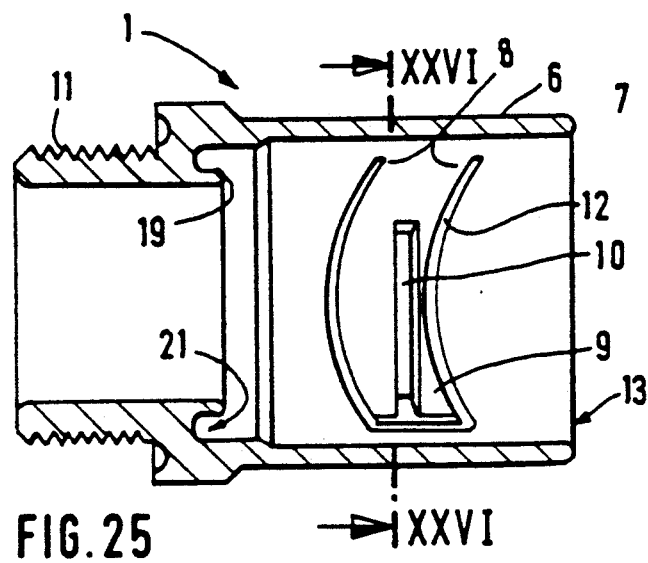
FIG. 25 is an axial sectional view of the fitting of FIG. 24.
Figure 26:
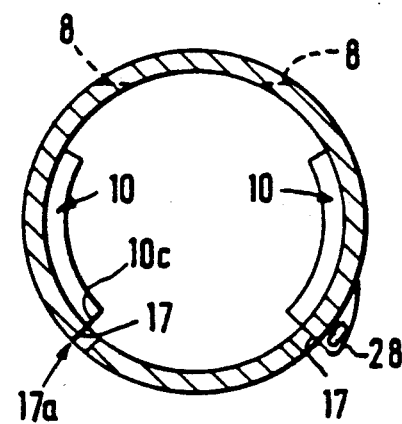
FIG. 26 is a transverse sectional view as seen in the direction of arrows from the line XXVI—XXVI of FIG. 25.
Figure 27:
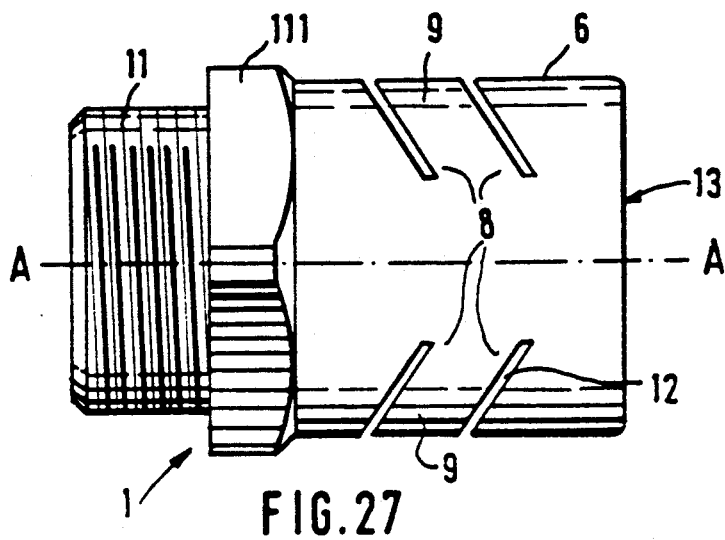
FIG. 27 is another elevational view of the fitting of FIGS. 24 to 26;°

The fitting of FIGS. 21 to 23 has two circumferentially extending prongs 9 each of which has an inwardly extending protuberance 10 disposed in a plane extending at right angles to the axis of the sleeve 1 and its tubular section 6. Each of the two prongs 9 resembles the prong in the fitting of FIGS. 4 to 6, i.e., each prong extends axially and circumferentially of the section 6. The hinge 8 for one of the prongs 9 of FIGS. 21 to 23 is offset with reference to the other hinge in the axial direction of the sleeve 1. The free end of one of the prongs 9 is nearer to the hinge 8 than to the free second end of the other prong 9.

The length of the protuberance 10 on one of the prongs 9 can but need not match the length of the other protuberance, and the same applies for the length of the two prongs. The hinges 8 can be disposed substantially diametrically opposite each other (except that they are offset in the axial direction of the section 6).

An advantage of the fitting of FIGS. 21 to 23 over the fitting of FIGS. 18-20 is that each of the two prongs 9 can be pivoted to permit radially outward movement of the respective protuberance 10. This facilitates the insertion and particularly the extraction of an end portion 2a or 3a. The two protuberances 10 of FIGS. 21 to 23 can but need not extend into one and the same external groove 5 of an end portion 2a or 3a.

The fitting of FIGS. 24 to 27 differs from the fitting of FIGS. 21 to 23 in that the hinges 8 for its prongs 9 are disposed at the same axial distance from the tube-receiving end 13 of the section 6, i.e., the two prongs are mirror images of each other relative to a plane A—A which extends midway between the two hinges 8 and includes the axis of the sleeve 1. The inwardly extending protuberances 10 of the prongs 9 are disposed in a common plane which extends at right angles to the axis of the section 6, i.e., at right angles to the plane A—A. These protuberances are also mirror images of each other (note FIG. 26), and the free end of at least one prong 9 is provided with an outwardly extending handle 28 to facilitate retraction of the respective protuberance 10 into and in part outwardly beyond the respective slot 12.

The feature that the free second ends of the two prongs 9 are adjacent each other (see FIG. 24) is desirable and advantageous because this renders it possible to manipulate both prongs with two fingers of one hand which holds the section 6 while the other hand is used to insert an end portion 2a or 3a into or to extract such end portion from the sleeve. A finger of one hand of the operator can engage and exert a pull upon the handle 28 or a push upon the adjacent end face 17 at the free second end of the respective prong 9. The reference character 17a denotes in FIG. 27 a rather pronounced edge between the respective end face 17 and the adjacent portion of external surface of the respective prong 9; such edge also facilitates proper engagement by a finger in order to move the free second end of the respective prong 9 radially outwardly, normally for the purposes of permitting convenient extraction of an end portion 2a or 3a from the tubular section 6.

An advantage of the handle or handles 28 is that they contribute to convenience of pivoting the respective prongs 9; however, such handles will not be used if it is desirable or advantageous to avoid any and all unevennesses (such as outwardly extending parts) on the external surface of the section 6 (except, of course, the polygonal intermediate portion 111 which is adjacent the externally threaded end 11 and serves the aforeexplained purpose of facilitating screwing of the end 11 into its unscrewing from a tapped bore or hole, e.g., into a tapped bore at one end of a sleeve which is otherwise a mirror image of the sleeve 1.

The handle or handles 28 will be omitted if the fitting is designed in such a way that a screwdriver or another implement is to be used in order to flex the prong or prongs 9 in directions to move their free second ends radially outwardly preparatory to introduction of the end portion 2a or 3a into the section 6 and especially preparatory to extraction of the end portion 2a or 3a from the sleeve 1. The working end of the implement can be caused to engage the adjacent end face 10e of the respective protuberance 10 (see particularly FIG. 3). As already mentioned above, the inclination and position of the adjacent edge face 18 of the section 6 (namely of the edge face at the free second end of the prong 9) are selected in such a way that the edge face 18 can be readily bypassed by the free second end of the prong 9 and that the edge face 18 provides room for insertion of the working end of an implement which is used to move the free second end of the prong radially outwardly subsequent to engagement of the end face 10c at the adjacent end of the protuberance 10.

The fitting of FIGS. 21 to 23 or 34-27 can be provided with more than two prongs 9, i.e., with more than two discrete one-piece or composite protuberances 10. Furthermore, two or more prongs 9 can be provided one behind the other in the axial (rather than circumferential) direction of the section 6; such fitting can be used under circumstances when the exact axial length of the sleeve 1 is of no consequence.

The free second ends of the prongs 9 which are shown in FIGS. 24 to 27 can be adjacent to but spaced from each other in the axial direction of the section 6. Such positioning of the second end portions of the prongs 9 renders it even more convenient to engage both second ends with the fingers of one hand which grasps the section 6 while the other hand manipulates an end portion 2a or 3a, either for the purpose of inserting the end portion into or of extracting the end portion from the section 6.

Figure 28:
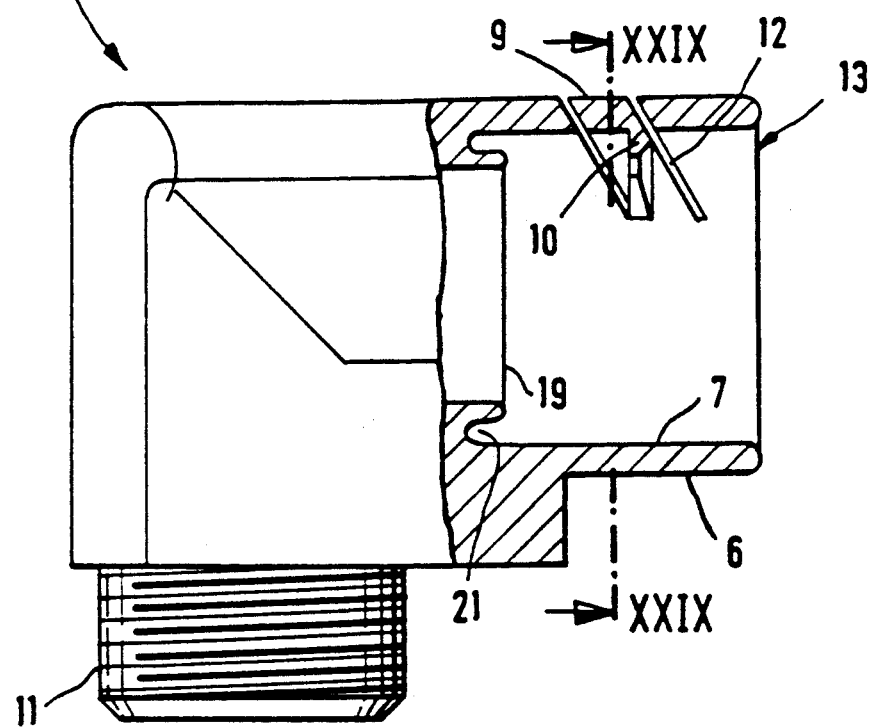
FIG. 28 is a partly elevational and partly axial sectional view of an L-shaped fitting.
Figure 29:
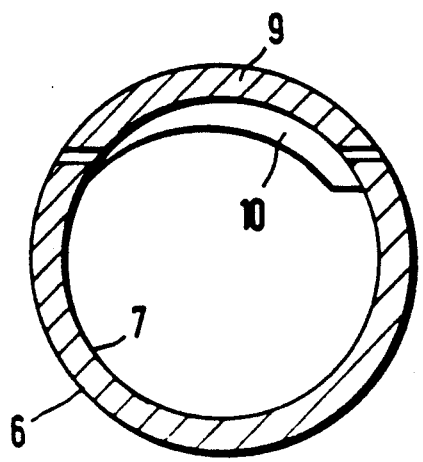
FIG. 29 is a transverse sectional view as seen in the direction of arrows from the line XXIX—XXIX of FIG. 28.
Figure 30:
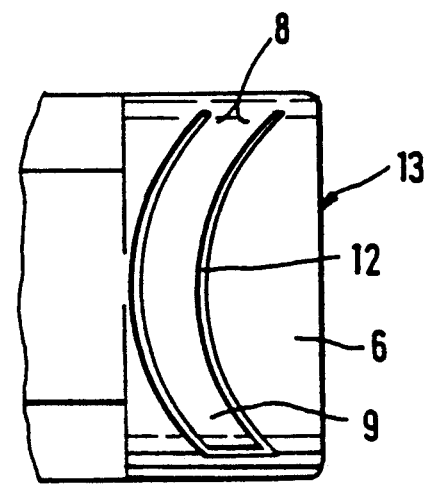
FIG. 30 is a fragmentary plan view of the fitting which is shown in FIG. 28.

FIGS. 28 to 30 show a fitting which is similar to the fitting of FIGS. 4 and 5 except that the height of the protuberance 10 varies in a manner as described with reference to FIGS. 18 to 20 and that the externally threaded end 11 extends at right angles to the major portion of the tubular section 6. The fitting of FIGS. 28 to 30 can be used with advantage where the available space is such that the end portion 2a or 3a of a tube 2 or 3 cannot be installed coaxially with the tapped bore or hole for the externally threaded end 11 of the tubular section 6.

Figure 31:
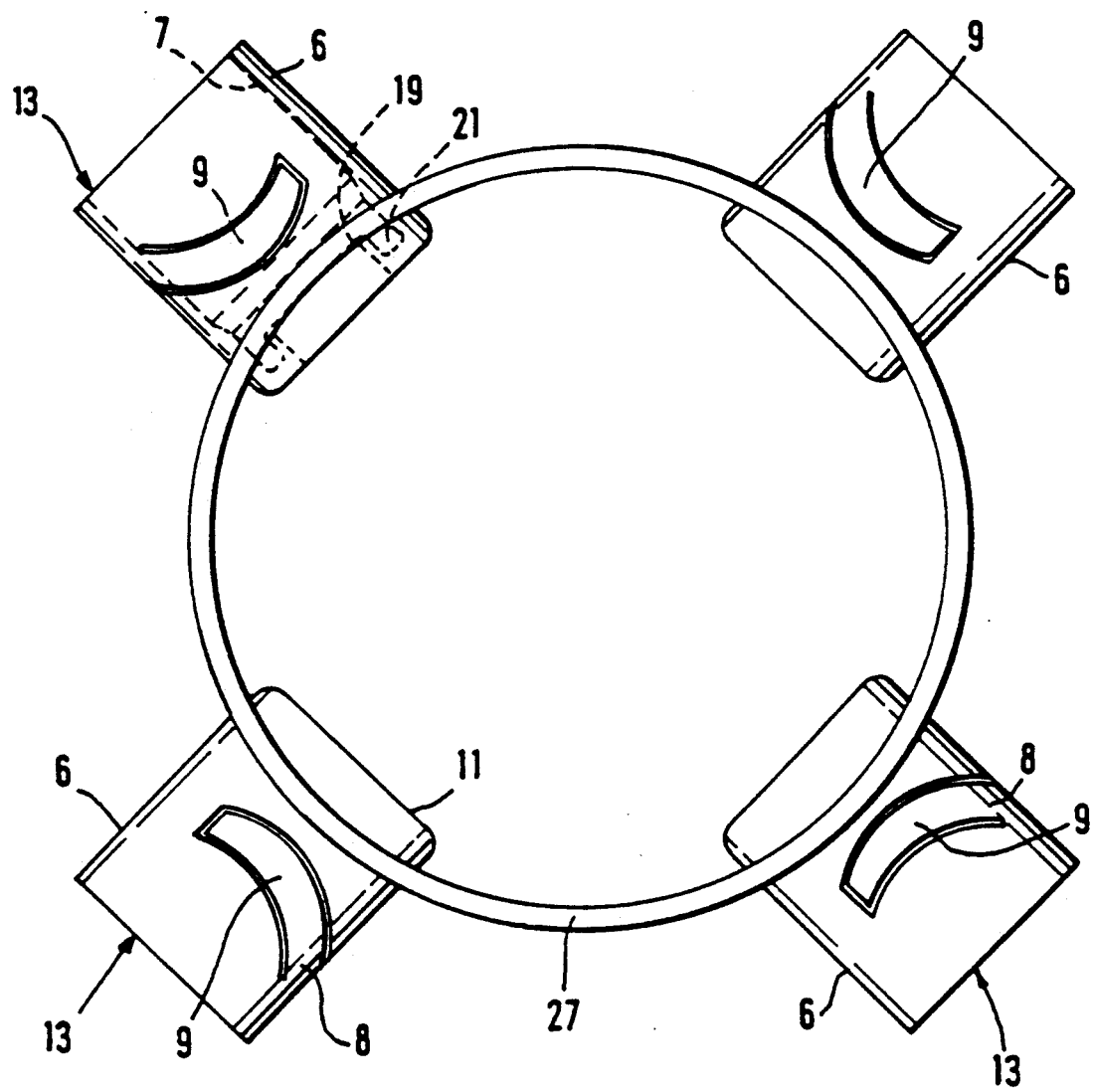
FIG. 31 is an end elevational view of a distributor box with four fittings of the type shown in FIGS. 4 to 6.

The distributor box 27 of FIG. 31 has a cylindrical wall with tapped bores for the externally threaded ends 11 of four equidistant fittings of the type shown in FIGS. 4 to 6. The tubes which are separably coupled to these fittings can serve as sheaths for electrical conductors having bare ends extending into the box 27. Alternatively, each of the tubes which are connectable to the fittings of FIG. 31 can serve to receive a stream of gaseous or hydraulic fluid from, or to deliver a stream of such fluid to, the box 27.

The number of fittings can be reduced to less than four or increased to five or more. Furthermore, all of the fittings need not be identical; for example, the box 27 of FIG. 31 can carry two fittings of the type shown in FIGS. 1 to 3 and two fittings of the type shown in FIGS. 24 to 27. Other combinations of two or more different types of fittings can be used with equal or similar advantage.

Referring again to FIG. 32, the annular pocket 21 of the internal stop 19 confines a first ring-shaped sealing element 20 which has a polygonal cross-sectional outline and fills or at least substantially fills the pocket when it is acted upon by the adjacent front face of the properly inserted end portion 2a of the flexible or rigid tube 2. This sealing element prevents penetration of air into the tube 2 and into the externally threaded end 11 of the section 6. In addition, the sealing element 20 prevents leakage of a fluid from the tube 2 or from the externally threaded end 11 into the surrounding atmosphere. A second sealing element 120 (e.g., an O-ring)

can be installed in one of the circumferentially extending external grooves 5 of the end portion 2a, preferably between the stop 19 and the protuberance 10. Such second sealing element 120 will be used if the pressure differential between the interior and the exterior of the tube 2 is very pronounced and/or when the tube 2 serves to convey a fluid medium which is not supposed to leak (even slightly) into the surrounding atmosphere and/or when atmospheric air could adversely affect the fluid in the tube 2.

More than two sealing elements can be used to even more reliably prevent the flow of a fluid medium from the tube 2 into the atmosphere or vice versa.

As already mentioned above, the distance of the stop 19 from the prong or prongs 9 of the tubular section 6 preferably equals or exceeds (and can be a multiple of) the combined width of a rib 4 and a groove 5 in the axial direction of the tube 2 or 3. This renders it possible to insert at least one sealing element 120 into that groove 5 or into those grooves which are disposed between the stop 19 and the protuberance or protuberances 10 provided, of course, that the front face of the inserted end portion 2a or 3a extends all the way or at least close to the stop 19.

The sealing element 20 and/or 120 need not be a circumferentially complete ring. For example, it is possible to convolute a length of rope into one or more external grooves 5 of the end portion 2a or 3a before the end portion is inserted into the section 6 by way of the tube-receiving end 13. The convoluted rope establishes a seal between the internal surface 7 of the section 6 and the bottom surface in the respective groove 5 as well as along the adjacent flanks of ribs 4 at the two axial ends of such groove.

Figure 32:
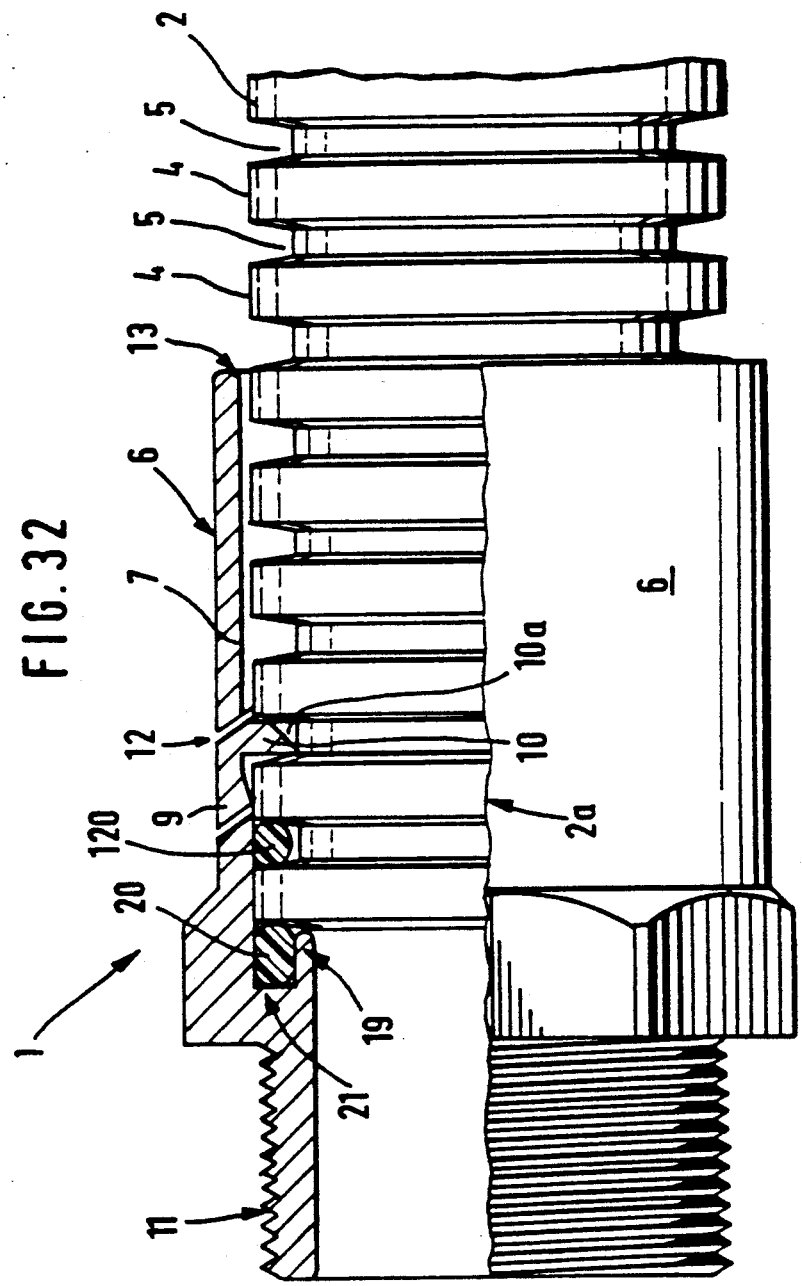
FIG. 32 is a partly elevational and partly axial sectional view of a fitting which is similar to that of FIGS. 4 to 6, and further showing (partly in an axial sectional view) the end portion of an externally grooved and ribbed flexible pipe or hose in the tubular section of the fitting.

FIG. 32 shows that the entire sealing element 120 is located to the left of the slot 12; this reduces the likelihood of leakage of confined fluid from the interior of the section 6 into the atmosphere by way of the slot 12 or penetration of air from the surrounding area into the section 6 and tube 2. In FIG. 32, the axial distance of the slot 12 from the stop 19 only slightly exceeds the combined width of a rib 4 and an adjacent groove 5. The leftmost rib 5 bears upon the stop 19 and preferably also upon the adjacent surface of the deformable sealing element 20 in the pocket 21. The sealing element 120 is received in the leftmost groove 5.

It often suffices to use the sealing element 20 alone or to omit the sealing element 20 and to employ at least one sealing element 120.

Figure 33:
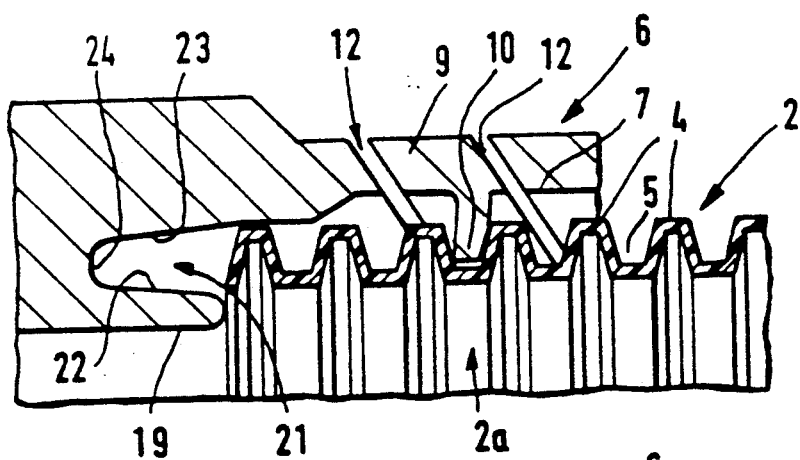
FIG. 33 is a fragmentary axial sectional view of an inserted flexible tubular body and of a fitting having a modified internal stop for the end portion of the tubular body.

FIG. 33 shows a portion of a fitting which is or can be similar to the fitting of FIGS. 4 to 6 and is coupled to the end portion 2a of a tube 2 (e.g., a flexible metallic or plastic hose) which has alternating internal and external circumferentially extending ribs 4 and grooves 5. The inner grooves 5 extend into the outer ribs 4, and the outer grooves 5 extend into the inner ribs 4. The leftmost or foremost outer rib 4 abuts the stop 19, and the pocket 21 of this stop is empty. The leftmost external rib 4 is at least closely adjacent or is maintained in actual sealing contact with the adjacent portion of the internal surface 7 of the tubular section 6 immediately to the right of the pocket 21 which is bounded by an annular outer surface 23 and an annular inner surface 22 of the stop 19. The reference character 24 denotes the bottom end of the pocket 21, i.e., that end of the pocket which is remotest from the tube-receiving end 13 of the section 6.

The outer surface 23 slopes toward the axis of the section 6 in a direction toward the bottom end 24 of the pocket 21, i.e., the width of the pocket (as measured in the radial direction of the section 6) decreases in a direction from the inlet toward the bottom end 24. This ensures that a sealing element 20 (not shown in FIG. 33) which is inserted into and overfills the pocket 21 is pressed against and is maintained in reliable sealing engagement with the surfaces 22 and 23 when such sealing element is compressed by the leftmost rib 4 of the properly inserted end portion 2a.

The inner surface 22 of the stop 19 which is shown in FIG. 33 is a substantially cylindrical surface which is coaxial with the tubular section 6.

The sealing action between the peripheral surface of the leftmost rib 4 and the adjacent portion of the internal surface 7 can suffice to prevent penetration of dust or other impurities into the end portion 2a or even to prevent the flow of a fluid between the interior of the tube 2 and the surrounding atmosphere. If the operator wishes to establish a more reliable sealing action, she or he will resort to a sealing element 20 and/or to a sealing element 120.

If the end portion 2a of the tube 2 is readily deformable or does not offer excessive resistance to axial deformation, it can be pushed deeper into the section 6 so that the front face of the end portion 2a exerts a greater force upon the stop 19. This enhances the sealing action between the fitting and the end portion 2a. For example, the end portion 2a can be pushed into the section 6 to such an extent that one or two or even more than two external ribs 4 advance beyond the protuberance 10 in a direction toward the stop 19.

The inner surface 22 of the stop 19 can slope radially outwardly toward the bottom end 24 of the pocket 21 in such a way that its maximum diameter (at the bottom end 24) at most equals or is less than the inner diameter of the end portion 2a. Thus, the foremost rib or ribs 4 of the end portion 2a need not contact the inner surface 22. On the other hand, the diameter of the frustoconical outer surface 23 decreases toward the bottom end 24 at a rate which ensures that at least the foremost rib 4 of the end portion 2a will sealingly engage the surface 23 if such foremost rib is pushed into the pocket 21, particularly all the way into or close to the bottom end 24 of the pocket.

The section 6 of the sleeve 1 and the end portion 2a can be readily rotated relative to each other when the end portion 2a is held in the axial position of FIG. 33. However, further penetration of the end portion 2a into the section 6 results in the establishment of progressively increasing frictional engagement between one or more foremost ribs 4 and the outer surface 23 so that the resistance to rotation of the section 6 and end portion 2a relative to each other increases. In other words, it is possible to regulate the force which is required to rotate the section 6 and the end portion 2a relative to each other by the simple expedient of changing the axial position of the sleeve 1 and the end portion 2a relative to each other. The same holds true for the sealing action, i.e., the sealing action between the sleeve 1 and the end portion 2a can be altered by the same simple expedient of causing the protuberance 10 to enter a different external groove 5.

Figure 34:
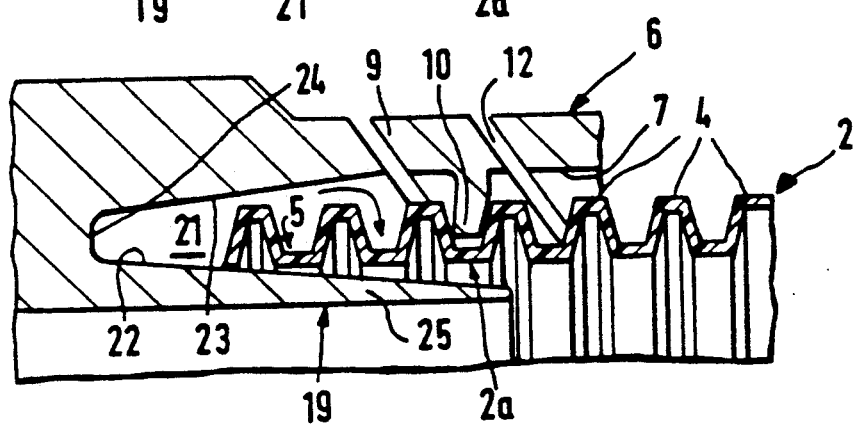
FIG. 34 is a fragmentary axial sectional view similar to that of FIG. 33 but showing a different stop.

FIG. 34 shows a modified fitting wherein the pocket 21 is much deeper than the pocket 21 of FIG. 33 and surrounds a frustoconical inner surface 22 which, in turn, surrounds an elongated tubular extension 25 of the stop 19. The outer surface 23 of the stop 19 which is shown in FIG. 34 converges toward the bottom end 24 of the pocket 21 so that the rate of reduction of the width of the pocket in a direction from the leftmost rib 4 of the end portion 2a toward the bottom end 24 is more pronounced than in FIG. 33.

The minimum diameter of the inner surface 22 is smaller than the inner diameter of the end portion 2a so that the extension 25 is free to enter the tube 2 and several ribs 4 and grooves 5 of the end portion 2a can enter the pocket 21. The minimum diameter of the outer surface 23 (namely the diameter of that portion of this surface which is adjacent the bottom end 24 of the pocket 21) is but need not be smaller than the outer diameter of the end portion 2a, i.e., the ribs 4 in the pocket 21 may but need not come into actual contact with the surface 23. On the other hand, the maximum diameter of the inner surface 22 at least equals but preferably exceeds the inner diameter of the end portion 2a so that at least the leftmost rib 4 of such end portion can sealingly engage the surface 22, at least in the region adjacent the bottom end 24 of the pocket 21.

The fitting of FIG. 34 ensures that the extension 25 can expand and thus sealingly engage at least the leftmost rib or ribs 4 of the end portion 2a in the section 6 to thus establish a highly reliable seal even in the absence of ring-shaped or other discrete separately produced sealing elements. This is often desirable and advantageous because it is then possible to assemble the end portion 2a with the fitting within a shorter interval of time and with savings in sealing material. If the tube 2 serves to convey water, the seal between the inner surface 22 and one or more leftmost ribs 4 of the properly inserted and retained end portion 2a suffices to prevent splashes, sprays or droplets of water from escaping via pocket 21 and slot 12 and/or tube-receiving end of the section 6.

If the end portion 2a which is shown in FIG. 34 is rather readily deformable, the operator can cause additional ribs 4 to penetrate into the pocket 21 and to engage at least the inner surface 22 of the stop 19. This enhances the sealing action, i.e., the sealing action is enhanced in response to penetration of the end portion 2a deeper into the pocket 21 which is tantamount to penetration of the extension 25 deeper into the end portion 2a.

An advantage of the fitting of FIG. 34 is that a liquid (e.g., water) which is conveyed by the tube 2 and happens to penetrate into the bottom end 24 of the pocket 21 (by leaking along the inner surface 22) is free to escape from the fitting by way of the slot 12 for the prong 9 and/or by way of the tube-receiving end of the section 6. Such escape of fluid which has penetrated into the bottom end 24 is prevented or rendered less likely if the end portion 2a is inserted into the pocket 21 to such an extent that at least the leftmost rib 4 comes into sealing engagement with the outer surface 23.

The minimum diameter of the inner surface 22 (at the inlet of the pocket 21) can be considerably smaller than the inner diameter of the end portion 2a. This ensures convenient introduction of the extension 25 into the end portion 2a.

The minimum diameter of the outer surface 23 (at the bottom end 24 of the pocket 21) can but need not be smaller than the outer diameter of the end portion 2a. Thus, the main (or the only) sealing action is or can be established between the foremost rib or ribs 4 of the inserted end portion 2a and the inner surface 22 of the stop 19. This often suffices to prevent uncontrolled flow of a fluid medium from or into the end portion 2a along the internal surface 7 of the tubular section 6. Moreover, by changing the frictional engagement between the surface 22 and the adjacent rib or ribs 4, the operator can select the magnitude of sealing action as well as the resistance which the section 6 and the end portion 2a of the tube 2 offer to rotation relative to each other.

Figure 35:
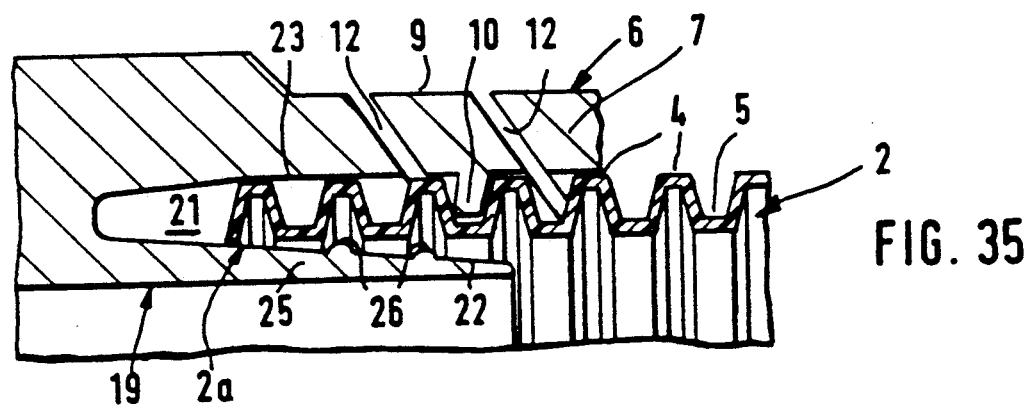
FIG. 35 is a fragmentary axial sectional view similar to that of FIG. 33 or 34 but showing still another stop.
Figure 36:
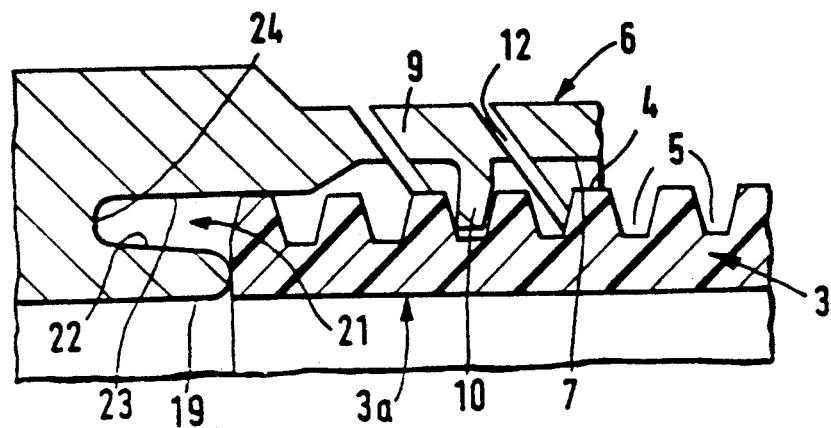
FIG. 36 is a fragmentary axial sectional view of a fitting which is similar to the fitting of FIG. 33, and a fragmentary axial sectional view of a rigid tubular body with the end portion of the tubular body inserted into and abutting the internal stop of the tubular section.

FIG. 35 shows a modification of the fitting of FIG. 34. The width of the rather deep pocket 21 in the stop 19 is selected in such a way that one or more ribs 4 which have been penetrated into the pocket are maintained in reliable sealing engagement with the inner surface 22 as well as with the outer surface 23. The outer diameter of the end portion 2a of the tube 2 is only slightly smaller than the diameter of internal surface 7 of the tubular section 6, and only the left-hand portion of the outer surface 23 has a pronounced or readily discernible frustoconical shape, i.e., such portion of the surface 23 tapers toward the axis of the section 6 in a direction toward the bottom end of the pocket 21.

The inner surface 22 of the stop 19 has one or more axially spaced apart projections 26 in the form of circumferentially complete ribs or in the form of rows of discrete projections. These projections can enter the inner grooves of the end portion 2a to assist the protuberance 10 in preventing unintentional extraction of the end portion 2a from the section 6.

If the projections 26 are circumferentially complete rings, they cooperate with the adjacent portions of the inner surface 22 and with the surfaces of adjacent ribs 4 to establish a labyrinth seal which effectively opposes penetration of confined fluid (such as water) toward the bottom end of the pocket 21. In addition, and if the axis of the section 6 is horizontal and the surface 22 slopes toward the axis of the section 6 in a direction toward the tube-receiving end of the section, any liquid which has gathered in the upper part of the labyrinth seal in the region of the projections 26 is likely to flow back into the tube 2.

It is to be noted that one or more separately produced sealing elements can be used in the fitting of FIG. 33, 34 and/or 35 if the operator desires to enhance the reliability of sealing action between the section 6 and the end portion 2a of the tube 2.

An advantage of the fitting of FIG. 35 is that the end portion 2a of the tube 2 can be moved into highly satisfactory sealing engagement with the section 6 without resorting to one or more separately produced seals. This is due to the fact that the maximum diameter of the surface 22 at least equals the inner diameter of the end portion 2a and that the minimum diameter of the surface 23 equals or is smaller than the outer diameter of the end portion 2a. Consequently, not only the surface 22 but also the surface 23 can be sealingly engaged by one or more foremost ribs 4 of the end portion 2a. Moreover, such sealing engagement between one or more ribs 4 and both surfaces bounding the pocket 21 can be relied upon to prevent unintentional angular displacement of the section 6 and end portion 2a relative to each other. For example, the inclination of the surfaces 22 and 23 can be selected in such a way that shifting of the end portion 2a to the right by the width of a rib 4 (i.e., the transfer of protuberance 10 from one groove 5 into the adjacent groove nearer to the front face of the end portion 2a) can suffice to permit convenient rotation of the section 6 and end portion 2a relative to each other. This can also apply for the fitting of FIG. 34.

FIG. 36 shows a portion of a fitting which is somewhat similar to the fitting of FIG. 33 and has a tubular section 6 which receives the end portion 3a of a rigid pipe 3. A seal can be established between the front face of the end portion 3a and the stop 19, between the periphery of the leftmost external rib 4 (the end portion 3a of the tube 3 shown in FIG. 36 does not have any internal ribs and/or internal grooves and the internal surface 7 of the section 6, and/or by resorting to one or more sealing elements of the type shown in FIG. 32 or analogous sealing elements.

The flexibility of the prong 9 is particularly important in this fitting because the end portion 3a of the pipe 3 (e.g., a steel pipe) is assumed to be rigid so that the ribs 4 cannot yield during penetration into the section 6 by way of the tube-admitting end 13 during extraction of the end portion 3a from the section 6.

Introduction of the end portion 2a or 3a of a tube 2 or 3 into the section 6 can be facilitated by appropriate configuration of the front face of the end portion 2a or 3a. This can be readily seen in FIGS. 33 to 36 wherein the front faces of the end portions 2a and 3a slope from the peripheries of the foremost ribs 4 toward the axes of the respective tubes in a direction toward the stop 19 so that such front faces tend to push the protuberance 10 radially outwardly and out of the way. The flank 10a of the protuberance 10 cooperates with the just described front face of the end portion 2a or 3a to cause a flexing of the prong 9 at the hinge 8 to thus permit introduction of the end portion 2a or 3a into the section 6 even if the free second end portion of the prong 9 is not pulled radially outwardly beyond the external surface of the section 6.

Figure 37:
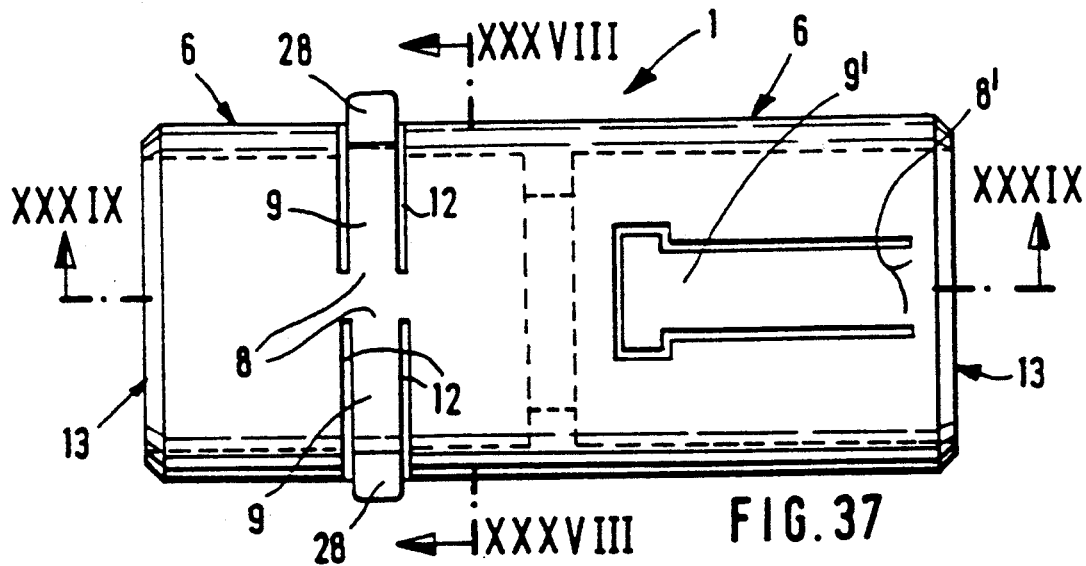
FIG. 37 is an elevational view of a fitting with two circumferentially extending prongs and at least one axially extending prong.
Figure 38:
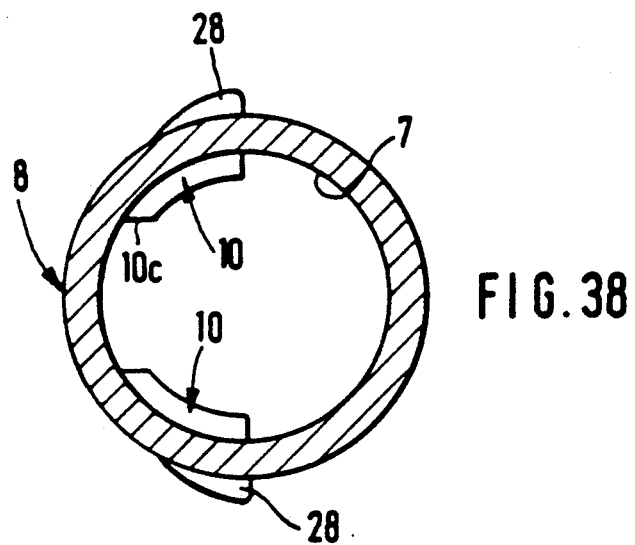
FIG. 38 is a transverse sectional view as seen in the direction of arrows from the line XXXVIII—XXXVIII of FIG. 37.
Figure 39:
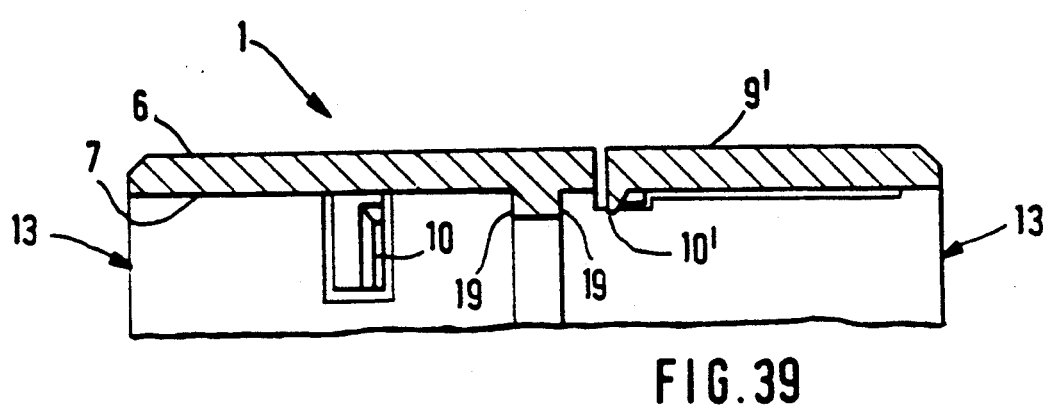
FIG. 39 is a fragmentary axial sectional view as seen in the direction of arrows from the line XXIX—XXIX of FIG. 37.

FIGS. 37 to 39 show a fitting having a relatively long sleeve 1 which does not or need not have an externally threaded end (such as the externally threaded end 11 of the sleeve 1 shown in FIG. 1). In other respects, the left-hand half of the fitting of FIGS. 37 to 39 is identical with or quite similar to the fitting of FIGS. 24 to 27 except that the two prongs 9 extend only in the circumferential direction of the section 6. The end portion 2a or 3a of a tube 2 or 3 (not shown in FIGS. 37-39) is introduced by way of the left-hand tube-receiving end 13 (as seen in FIG. 37 or 39) and ultimately abuts (or preferably abuts) an annular internal stop 19. The protuberances at the inner sides of the prongs 9 penetrate into the adjacent groove of the inserted end portion 2a or 3a to prevent unintentional extraction.

The right-hand portion of the section 6 is provided with one or more axially extending elongated prongs or tongues 9' each of which can be flexed in the region of the respective hinge 8' and the free end of each of which has a relatively short circumferentially extending internal protuberance 10'. When an end portion 2a or 3a is introduced into the section 6 by way of the right-hand end 13 (as seen in FIG. 37 or 39, the protuberance 10' penetrates into the adjacent external groove 5 when the front face of such end portion 2a or 3a reaches the respective (right-hand) side of the internal stop 19.

The axially extending prong or prongs 9' can be replaced with one or more circumferentially extending prongs 9. For example, the right-hand half of the section 6 which is shown in FIG. 37 can be a mirror image of the left-hand half. This renders it possible to reduce the axial length of the sleeve 1.

The circumferentially extending prongs 9 of the section 6 have radially outwardly extending handles 28. As mentioned above, these handles can be engaged by two fingers of one hand while the operator uses the other hand to insert the end portion 2a or 3a of a tube 2 or 3 into or to extract such end portion from the left-hand portion of the section 6.

The circumferentially extending protuberances 10 are shorter than the respective prongs 9 because they do not extend all the way to the respective hinges 8 (see FIG. 38). The inner end faces 10c of the protuberances 10 are inclined in such a way that each of these protuberances can be moved radially outwardly beyond the internal surface 7 of the section 6 in response to a relatively short radially outward movement of the respective handles 28 and of the free second end portions of the respective prongs 9.

The axial length of the left-hand portion of the section 6 (i.e., of that portion which carries the circumferentially extending prongs 9) can be reduced in half or even more without unduly affecting the reliability of connection between the end portion 2a or 3a of a tube 2 or 3 and the protuberances 10. Such shortening of one portion of the section 6 will be resorted to if the space which is available for a fitting cannot accommodate the relatively long fitting of FIGS. 37 to 39.

One of the two prongs 9 of FIGS. 37 to 39 can be omitted, and this fitting can employ one or more prongs of the type shown in FIGS. 4 to 6 or in other Figures.

A relatively long sleeve 1 can be provided with two sets of axially extending prongs 9'. It is even possible to employ one or more axially extending prongs 9' and one or more circumferentially extending prongs 9 to engage and hold one and the same end portion 2a or 3a.

In the fitting of FIGS. 37 to 39, the distance between the stop 19 and one of the tube-receiving ends 13 equals or closely approximates the distance between the stop and the other tube-receiving end 13.

Figure 40:
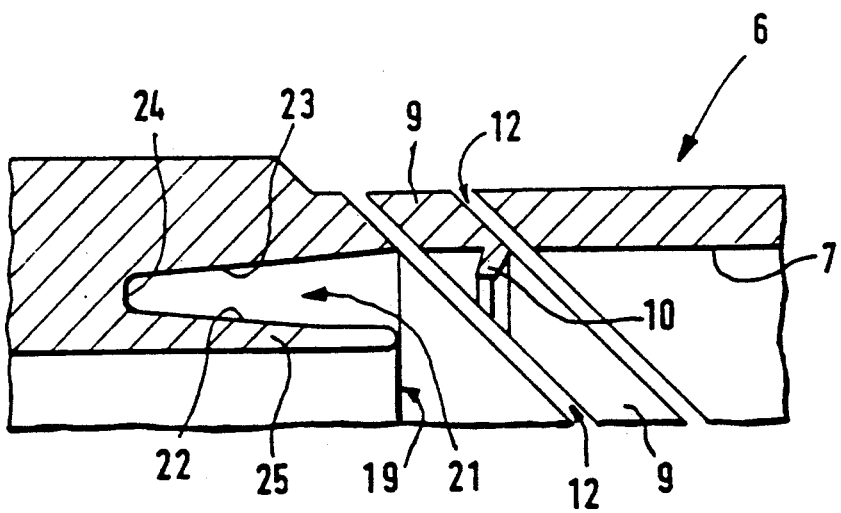
FIG. 40 is a fragmentary axial sectional view of a fitting wherein the configuration of the pocket in the internal stop departs from that of the pockets in the stops of other fittings.

FIG. 40 shows a modification of the fittings which are illustrated in FIGS. 34 and 35. That portion of the inner surface 22 of the stop 19 which is adjacent the inlet of the pocket 21 is cylindrical, and the left-hand portion of the surface 22 is a conical frustum with a base at the bottom end 24 of the pocket 21. The outer surface 23 of the stop 19 slopes all the way from the inlet toward the bottom end 24 of the pocket 21 in a direction toward the axis of the section 6. At least one rib 4 of an end portion 2a which penetrates into the pocket 21 can be caused to sealingly engage the surface 22 and/or 23 so that it is not always necessary or absolutely necessary to employ one or more separately produced sealing elements. For example, the seal between a rib 4 and the surface 22 and/or 23 in the pocket 21 of FIG. 40 can suffice to prevent penetration of impurities into the end portion 2a which extends into the section 6 and into the pocket 21 of the stop 19.

It is further possible to reduce the diameter of the outer surface 23 and/or to increase the diameter of the inner surface 22 toward the bottom end 24 of the pocket 21 in stepwise fashion. Furthermore, it is equally within the purview of the invention to provide the stop 19 with an at least partially concave or convex inner surface 22 and/or with an at least partially concave or convex outer surface 23.

Figure 41:
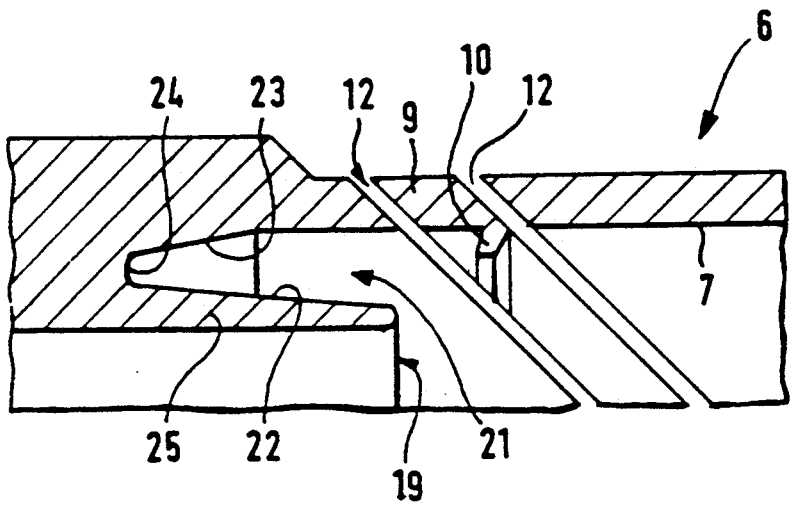
FIG. 41 is a similar fragmentary axial sectional view but showing a different pocket.

FIG. 41 shows a modification of the fitting of FIG. 40. The inner surface 22 of the stop 19 is a conical frustum with a diameter which increases in a direction from the inlet toward the bottom end 24 of the pocket 21. The outer surface 23 of the stop 19 includes a cylindrical portion adjacent the inlet of the pocket 21 and a frustoconical portion with a diameter which decreases in a direction toward the bottom end 24.

Figure 42:
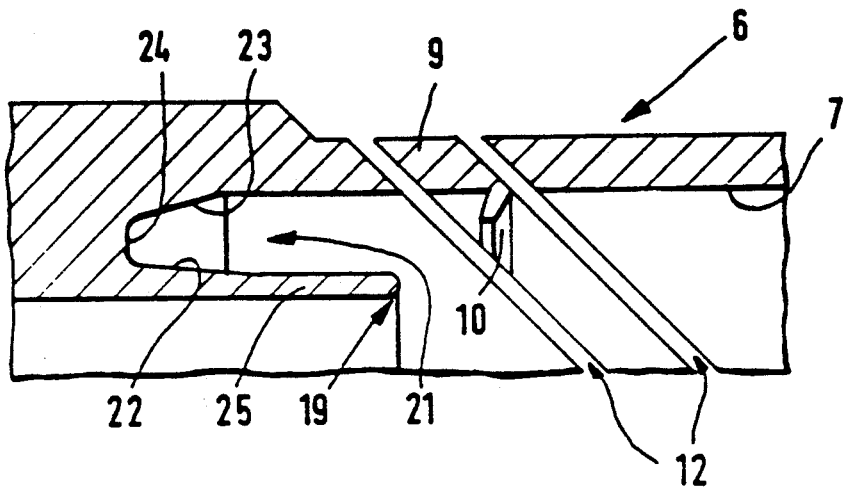
FIG. 42 is a similar fragmentary axial sectional view but showing still another pocket.

The stop 19 of the fitting which is shown in FIG. 42 has an inner surface 22 with a cylindrical portion adjacent the inlet of the pocket 21 and a frustoconical portion with a diameter which increases in a direction from the cylindrical portion toward the bottom end 24 of the pocket. The outer surface 23 also includes a cylindrical portion which is adjacent the inlet of the pocket 21. The remaining portion of the outer surface 23 is a conical frustum with a diameter which decreases in a direction toward the bottom end 24 of the pocket 21.

The tubular extensions 25 of the stops 19 which are shown in FIGS. 40 to 42 can extend well into the end portion 2a of a tube 2 so that the end portion 2a is confined from within and from without. This reduces the likelihood of unintentional extraction of the end portion 2a from the respective section 6, even if the material of the end portion 2a is readily deformable. The pocket 21 of the stop 19 which is shown in FIG. 40, 41 or 42 can also serve to receive one or more ribs 4 of the end portion 3a of a rigid or practically rigid tube 3 (which does not have or need not have any internal ribs and/or grooves), i.e., the extension 25 can project into the end portion 3a or into the end portion 2a of a tube 3 or 2.

The assembly of the improved fitting with the end portion 2a or 3a of a tube 2 or 3 can be completed in several stages. For example, a first stage can involve introduction of the end portion 2a or 3a into the section 6 to an extent such that the sleeve 1 is free to turn relative to the tube 2 or 3. The next step can involve screwing the end 11 of the section 6 into the tapped bore or hole of a support, such as the box 27 of FIG. 31. The next-following step involves further penetration of the end portion 2a or 3a into the section 6 in order to reduce the likelihood of undesirable rotation of the section and the end portion relative to each other and/or to enhance the sealing action between the foremost rib or ribs 4 and the adjacent surface or surfaces 22 and/or 23 of the stop 19.

Of course, if the surfaces 22 and 23 are dimensioned in such a way that they do not contact the adjacent rib or ribs 4 irrespective of the extent of penetration of an end portion 2a or 3a into the pocket 21, the fitting and the tube 2 or 3 are free to turn relative to each other regardless of the extent of penetration of end portion 2a or 3a into the section 6 and into the pocket 21 of the stop 19.

It is further possible to select the diameters of the inner and outer surfaces 22, 23 of a stop 19 in such a way that neither of these surfaces is contacted by a rib 4 of the end portion 2a or 3a of a tube 2 or 3. Thus, the end portion 2a or 3a is then engaged only by one or more protuberances 10 and/or 16 and/or projections 14 of the fitting. This is desirable and advantageous if the fitting should be free to readily turn around the end portion 2a or 3a of a tube and/or if the end portion 2a or 3a should be free to turn relative to the tubular section 6.

The features of the aforedescribed embodiments of the improved fitting can be combined in a number of ways, depending upon the desired characteristics of the fitting and on the nature of connection between the fitting and the end portion of a flexible or rigid tube. For example, the number and/or the length of protuberances will be increased if the fitting is to remain in adequate engagement with the end portion of a tube even when a very strong force is applied in a direction to extract the end portion of the tube from the section 6.

The same holds true for the provision of or dispensal with the projection 14. The design of the fitting will also depend upon the desired extent and reliability of sealing action between the end portion of a tube and the section 6. On the other hand, the extent of sealing action will depend upon the desirability or absence of desirability to readily turn the fitting and the end portion of a tube relative to each other. The depth of the protuberance or protuberances and of the projection or projections (if any) will also depend upon the magnitude of resistance which the fitting is to offer to axial displacement of the end portion 2a or 3a relative to the section 6. The width of the slot or slots 12 will depend upon the desired extent of movability of the free second end portion or portions of the prong or prongs in the axial direction of the section 6. The length and configuration of the surfaces 9a and 12a will depend upon the desired area of contact between a surface 9a and the adjacent surface 12a in response to axial shifting of the free second end of the respective prong.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A fitting for attachment to an end portion of a tube having circumferentially extending external ribs alternating with circumferentially extending external grooves, comprising a sleeve including a tubular section having a tube-receiving end arranged to receive the end portion of a tube; and a substantially circumferentially extending elastic prong having a first end integral with said section and a free second end, said section having a slot surrounding said prong and said prong having an inner side provided with a protuberance arranged to enter a groove of the end portion which is introduced into said section, said section further having an internal surface, an external surface and lateral surfaces bounding a portion of said slot and extending substantially circumferentially of said section, one of said lateral surfaces being disposed between said tube-receiving end and the other of said lateral surfaces and being inclined from said external surface toward said internal surface in a direction toward said tube-receiving end, said prong having a lateral surface adjacent and complementary to the one lateral surface of said section.

2. The fitting of claim 1, wherein said section and the first end of said prong define an elastic hinge which is constructed and arranged to permit outward flexing of said prong in a direction to extract said protuberance from a groove of the end portion in said section.

3. The fitting of claim 1, wherein said protuberance extends in the circumferential direction of said section and said prong has a plurality of substantially circumferentially extending lateral surfaces at least one of which is at least substantially parallel with said protuberance.

4. The fitting of claim 1, wherein said protuberance has a flank facing said tube-receiving end and at least a portion of said flank slopes from said internal surface toward the axis of said section in a direction away from said tube-receiving end.

5. The fitting of claim 1, wherein the height of said protuberance in the radial direction of said section varies in a direction from one of said first and second ends toward the other of said first and second ends.

6. The fitting of claim 1, wherein said protuberance is spaced apart from the first end of said prong.

7. The fitting of claim 1, wherein said section and said first end of said prong define an elastic hinge which is constructed and arranged to permit flexing of said prong in the radial and axial directions of said section.

8. The fitting of claim 1, wherein at least a portion of one of said lateral surfaces is at least substantially parallel to at least a portion of the other of said lateral surfaces.

9. The fitting of claim 1, wherein said protuberance has a first flank facing toward and a second flank facing away from said tube-receiving end, said flanks extending substantially circumferentially of said section and said second flank being steeper relative to the axis of said section than said first flank.

10. The fitting of claim 9, wherein said second flank is substantially normal to the axis of said section.

11. The fitting of claim 9, wherein said second flank makes an acute angle with a plane which is normal to the axis of said section.

12. The fitting of claim 1, wherein said protuberance has an end face adjacent one of said first and second ends and said end face extends substantially radially of said section.

13. The fitting of claim 1, wherein said protuberance has an end face adjacent one of said first and second ends and located in a plane which is substantially parallel to and spaced apart from the axis of said section.

14. The fitting of claim 1, wherein said slot has two substantially parallel portions flanking said prong and extending circumferentially as well as axially of said section.

15. The fitting of claim 1, wherein said prong has an arcuate shape and extends axially as well as circumferentially of said section.

16. The fitting of claim 1, wherein said inner side of said prong has a second protuberance extending circumferentially of said section.

17. The fitting of claim 16, wherein said protuberances are spaced apart from each other in the axial direction of said section.

18. The fitting of claim 1, wherein said protuberance extends circumferentially of said section along an arc of between approximately ⅓d and 1/5d wherein d is the inner diameter of said section.

19. The fitting of claim 1, wherein said protuberance extends circumferentially of said section along an arc of at least 100 degrees.

20. The fitting of claim 1, wherein said protuberance extends circumferentially of said section along an arc of at least 180 degrees.

21. The fitting of claim 1, wherein said section has at least one additional slot and said sleeve comprises an additional prong in said at least one additional slot.

22. The fitting of claim 1, wherein said prong has an end face at said second end thereof and said internal surface includes a portion adjacent and making an acute angle with said end face.

23. The fitting of claim 1, wherein said section has an internal stop for the end portion of a tube therein.

24. The fitting of claim 23 for attachment to an end portion of a tube wherein a rib and a groove have a predetermined combined width in the axial direction of the tube, said prong being disposed between said stop and said tube-receiving end at a distance from said stop which at least equals said predetermined width.

25. The fitting of claim 23, wherein said stop has an annular pocket extending substantially axially of said section in a direction away from said tube-receiving end.

26. The fitting of claim 25, wherein said stop includes a tubular extension which is surrounded by said pocket and extends axially of said section toward said tube-receiving end at least close to said slot.

27. The fitting of claim 26 for attachment to an end portion of a tube having a predetermined outer diameter and a predetermined inner diameter, wherein said stop has an annular inner surface surrounding said extension in said pocket, and having a first portion nearer to and a second portion more distant from said tube-receiving end, said first portion having a diameter smaller and said second portion having a diameter greater than said inner diameter, said stop further having an outer surface surrounding said pocket and at least a portion of said outer surface having a diameter at least equal said outer diameter.

28. The fitting of claim 26 for attachment to an end portion of a tube having a predetermined inner diameter and a predetermined outer diameter, wherein said stop has an annular inner surface surrounding said extension and an annular outer surface bounding said pocket, said pocket having a bottom end remote from said tube-receiving end and said inner surface having a portion adjacent said bottom end and having a diameter greater than said inner diameter, said outer surface having a portion adjacent said bottom end and having a diameter at most equal to said outer diameter.

29. The fitting of claim 26 for attachment to an end portion of a tube having a predetermined inner diameter and a predetermined outer diameter, wherein said stop has an annular inner surface surrounding said extension and an annular outer surface surrounding said pocket, said inner surface having a maximum-diameter portion with a diameter at least equal to said inner diameter and said outer surface having a minimum-diameter portion at most equal to said outer diameter.

30. A fitting for attachment to an end portion of a tube having circumferentially extending external ribs alternating with circumferentially extending external grooves, comprising a sleeve including a tubular section having a tube-receiving end arranged to receive the end portion of a tube; and a substantially circumferentially extending elastic prong having a first end integral with said section and a free second end, said section having a slot surrounding said prong and said prong having an inner side provided with a protuberance arranged to enter a groove of the end portion which is introduced into said section, said section further, an external surface and an internal surface, said slot having a first substantially circumferentially extending portion nearer to and a second substantially circumferentially extending portion more distant from said tube-receiving end, at least the first portion of said slot sloping in a direction toward said tube-receiving end, said protuberance being spaced apart from one end of said prong and said part of the first portion of said slot being adjacent said protuberance.

31. A fitting for attachment to an end portion of a tube having circumferentially extending external ribs alternating with circumferentially extending external grooves, comprising a sleeve including a tubular section having a tube-receiving end arranged to receive the end portion of a tube; and a substantially circumferentially extending elastic prong having a first end integral with said section and a free second end, said section having a slot surrounding said prong and said prong having an inner side provided with a protuberance arranged to enter a groove of the end portion which is introduced into said section, said section further having an external surface and an internal surface, said slot having a first substantially circumferentially extending portion nearer to and a second substantially circumferentially extending portion more distant from said tube-receiving end, at least the first portion of said slot sloping at least in part from said external surface toward said internal surface in a direction toward said tube-receiving end, said second end of said prong being movable within said slot in the axial direction of said section toward and away from said tube-receiving end as the tube engages with or disengages from the protuberance.

32. A fitting for attachment to an end portion of a tube having circumferentially extending external ribs alternating with circumferentially extending external grooves, comprising a sleeve including a tubular section arranged to receive the end portion of a tube; and a substantially circumferentially extending elastic prong having a first end integral with said section and a free second end, said section having a slot surrounding said prong and said prong having an inner side provided with a protuberance arranged to enter a groove of the end portion which is introduced into said section, said section further having an internal surface and a projection remote from said prong and receivable in a groove of the end portion in said section and disposed substantially diametrically opposite said protuberance.

33. The fitting of claim 32, wherein said projection extends substantially circumferentially of said section and has two ends and an intermediate portion, said intermediate portion being nearer to the axis of said section than at least one end of said projection.

34. A fitting for attachment to an end portion of a tube having circumferentially extending external ribs alternating with circumferentially extending external grooves, comprising a sleeve including a tubular section arranged to receive the end portion of a tube; and a substantially circumferentially extending elastic prong having a first end integral with said section and a free second end, said section having a slot surrounding said prong and said prong having an inner side provided with a first protuberance arranged to enter a groove of the end portion which is introduced into said section, and a second protuberance extending circumferentially of said section, said protuberances being spaced apart from each other in the axial direction of said section, one of said protuberances having a gap and the other of said protuberances being in line with said gap in the axial direction of said section.

35. A fitting for attachment to an end portion of a tube having circumferentially extending external ribs alternating with circumferentially extending external grooves, comprising a sleeve including a tubular section arranged to receive the end portion of a tube; and a substantially circumferentially extending elastic prong having a first end integral with said section and a free second end, said section having a slot surrounding said prong and said prong having an inner side provided with a protuberance arranged to enter a groove of the end portion which is introduced into said section, said protuberance including a plurality of portions which are spaced apart from each other in the circumferential direction of said section.

36. A fitting for attachment to an end portion of a tube having circumferentially extending external ribs alternating with circumferentially extending external grooves, comprising a sleeve including a tubular section arranged to receive the end portion of a tube; and a substantially circumferentially extending elastic first prong having a first end integral with said section and a free second end, said section having a first slot surrounding said first prong and said first prong having an inner side provided with a protuberance arranged to enter a groove of the end portion which is introduced into said section, said section having at least one additional slot and said sleeve comprising an additional prong in said at least one additional slot, the first end of one of said prongs being nearer to the first end than to the second end of the other of said prongs and said first end of said one prong being more distant from the second end than from the first end of said other prong.

37. A fitting for attachment to an end portion of a tube having circumferentially extending external ribs alternating with circumferentially extending external grooves, comprising a sleeve including a tubular section arranged to receive the end portion of a tube; and a substantially circumferentially extending elastic prong having a first end integral with said section and a free second end, said section having a slot surrounding said prong and said prong having an inner side provided with a protuberance arranged to enter a groove of the end portion which is introduced into said section, said section further having a tube-receiving end and an internal stop for the end portion of a tube therein, said stop having an annular pocket extending substantially axially of said section in a direction away from said tube-receiving end, said stop further having confronting annular inner and outer surfaces bounding said pocket and at least a portion of at least one of said inner and outer surfaces being inclined toward the other of said inner and outer surfaces in a direction away from said tube-receiving end so as to reduce the radial width of the corresponding portion of said pocket.

38. The fitting of claim 37, wherein the width of said pocket is such that at least one of said inner and outer surfaces is contacted by the end portion which is inserted into said section by way of said tube-receiving end and extends into said pocket.

39. A fitting for attachment to an end portion of a tube having circumferentially extending external ribs alternating with circumferentially extending external grooves, comprising a sleeve including a tubular section arranged to receive the end portion of a tube; and a substantially circumferentially extending elastic prong having a first end integral with said section and a free second end, said section having a slot surrounding said prong and said prong having an inner side provided with a protuberance arranged to enter a groove of the end portion which is introduced into said section, said section having an internal stop for the end portion of a tube therein and said section further having a tube-receiving end, said stop having an annular pocket extending substantially axially of said section in a direction away from said tube-receiving end and said stop including a tubular extension which is surrounded by said pocket, the thickness of said extension increasing radially of said section in a direction away from said tube-receiving end.

* * * * *